US011668201B2

(12) United States Patent
Biswas et al.

(10) Patent No.: US 11,668,201 B2
(45) Date of Patent: Jun. 6, 2023

(54) ENTRYWAY SYSTEM INCLUDING A DIVIDED VOLUTE TURBOCHARGER HAVING VARIABLE TURBINE GEOMETRY WITH AERODYNAMIC SPACERS AND VANE RING WITH PLURALITY OF ROTATABLE VANES

(71) Applicant: BorgWarner Inc., Auburn Hills, MI (US)

(72) Inventors: Abhishek Biswas, Asheville, NC (US); John Zagone, Hendersonville, NC (US); Benjamin Hurwitz, Asheville, NC (US); Craig Andrew Colont, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/446,794

(22) Filed: Sep. 2, 2021

(65) Prior Publication Data
US 2022/0074314 A1    Mar. 10, 2022

Related U.S. Application Data

(60) Provisional application No. 63/075,581, filed on Sep. 8, 2020.

(51) Int. Cl.
*F01D 9/04* (2006.01)
*F01D 25/24* (2006.01)

(52) U.S. Cl.
CPC .............. *F01D 9/045* (2013.01); *F01D 25/24* (2013.01); *F05D 2220/40* (2013.01); *F05D 2240/128* (2013.01); *F05D 2240/14* (2013.01)

(58) Field of Classification Search
CPC .... F01D 9/045; F01D 9/026; F05D 2240/128; F05D 2240/14; F05D 2250/411; F02B 27/06
See application file for complete search history.

(56) References Cited

U.S. PATENT DOCUMENTS 8,585,353 B2    11/2013    Arnold
8,585,355 B2    11/2013    Henderson et al.
(Continued)

FOREIGN PATENT DOCUMENTS

WO          14140598 A1    9/2014

*Primary Examiner* — Courtney D Heinle
*Assistant Examiner* — Danielle M. Christensen
(74) *Attorney, Agent, or Firm* — Howard & Howard Attorneys PLLC

(57) ABSTRACT

A system includes a divided volute turbocharger having variable turbine geometry. The turbocharger includes a turbine housing, first and second volutes separated by a wall having a first and second tongue, and a turbine housing outlet. The system also includes a turbine wheel disposed in the turbine housing and a vane ring disposed in the turbine housing between the turbine wheel and the volutes. The vane ring includes a plurality of rotatable vanes disposed on a vane ring surface of an annular disk in an asymmetric or asymmetric vane pattern that receives the turbine wheel therewithin and a pair of aerodynamic spacers spaced circumferentially outward of the plurality of vanes with each spacer positioned adjacent to a respective one tongue, with the spacers and vanes directing and controlling the flow of exhaust from the volutes into the turbine wheel with generally equal flow while significantly reducing HCF forcing function.

20 Claims, 17 Drawing Sheets

(56) References Cited

U.S. PATENT DOCUMENTS

| | | |
|---|---|---|
| 8,984,879 B2 | 3/2015 | Watson et al. |
| 9,016,060 B2 * | 4/2015 | Sauerstein ............ F01D 17/165 |
| | | 415/206 |
| 9,932,843 B2 * | 4/2018 | Narehood ............. F01D 17/165 |
| 10,227,889 B2 * | 3/2019 | Arnold ...................... F02C 6/12 |
| 2018/0266268 A1 * | 9/2018 | Karstadt ............... F01D 17/165 |
| 2020/0024988 A1 | 1/2020 | Comeau et al. |
| 2021/0140366 A1 | 5/2021 | Williams et al. |

\* cited by examiner

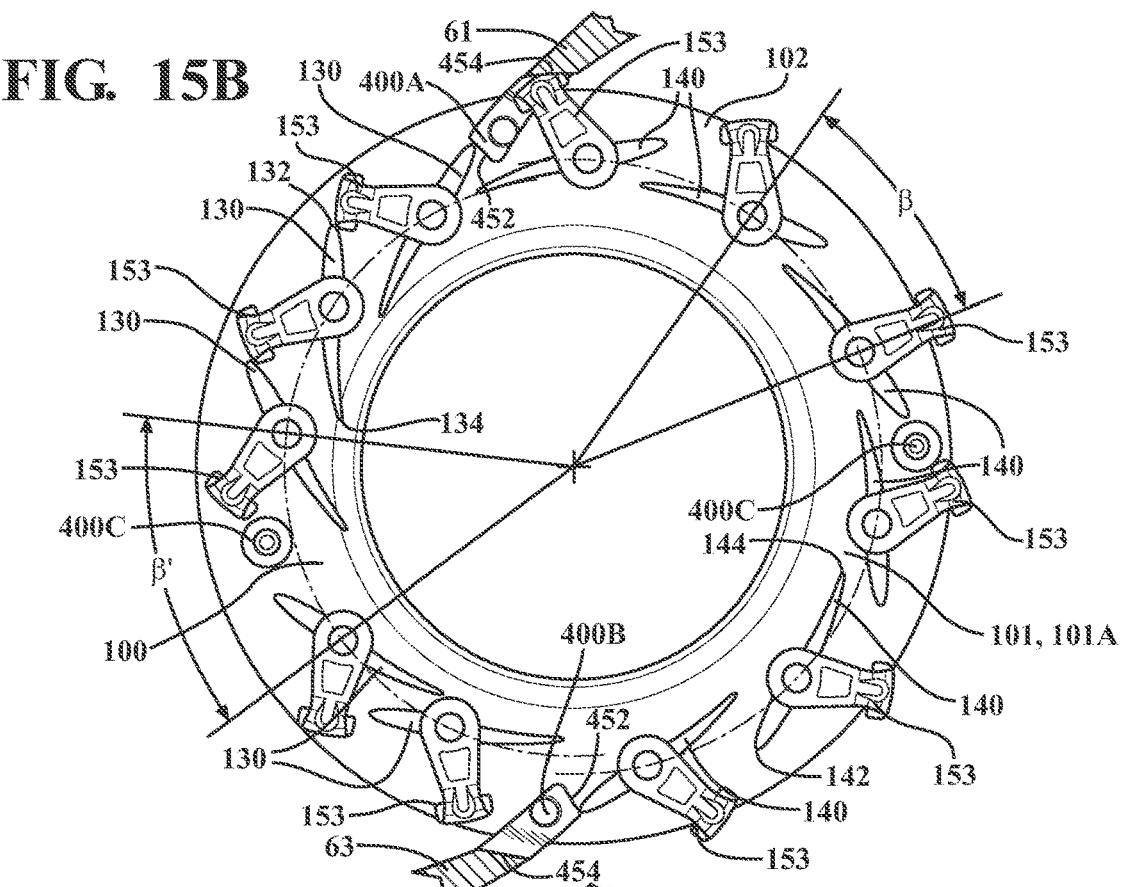
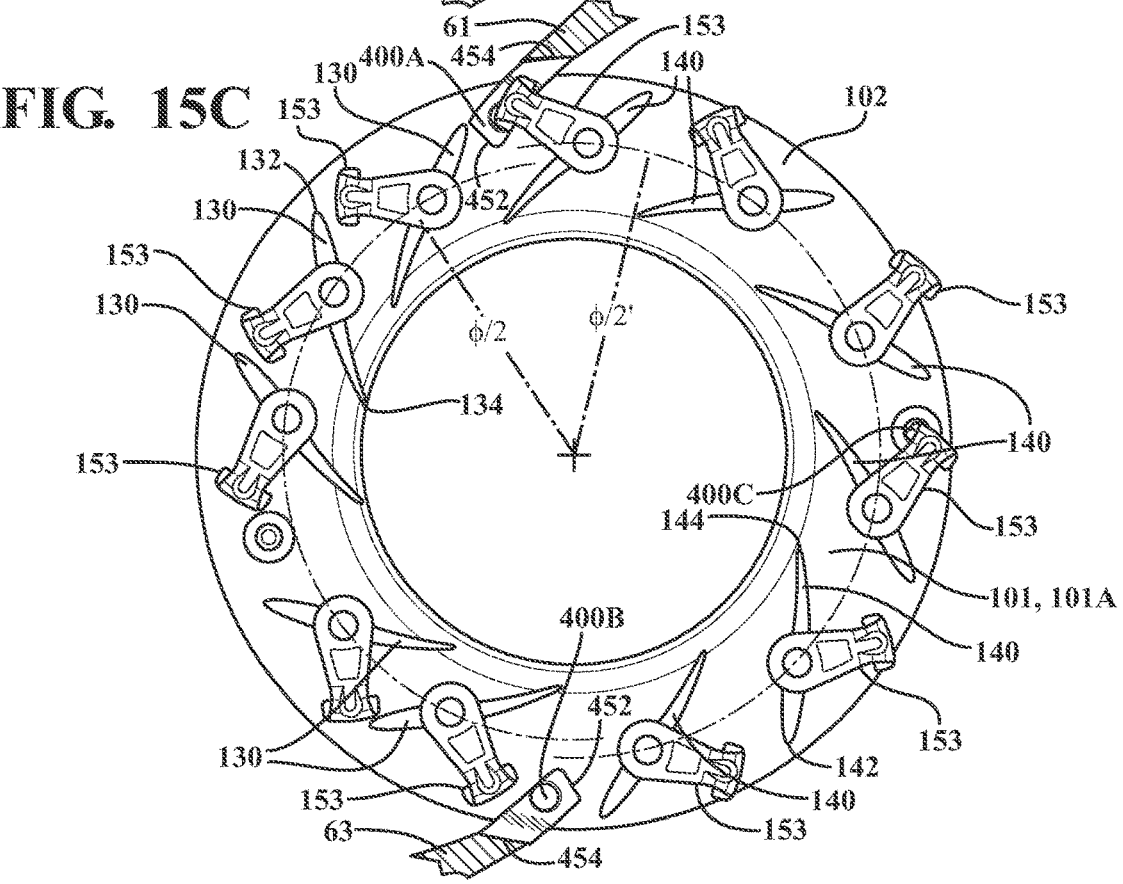

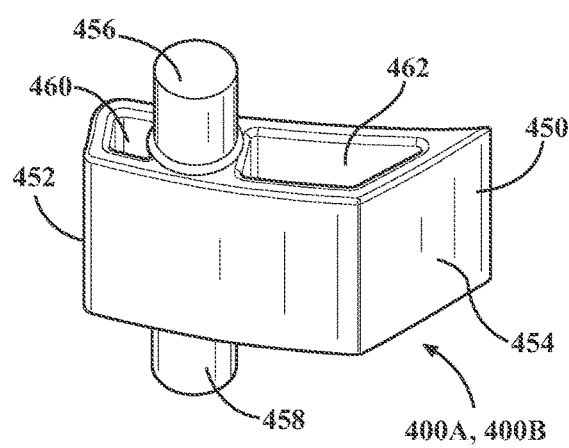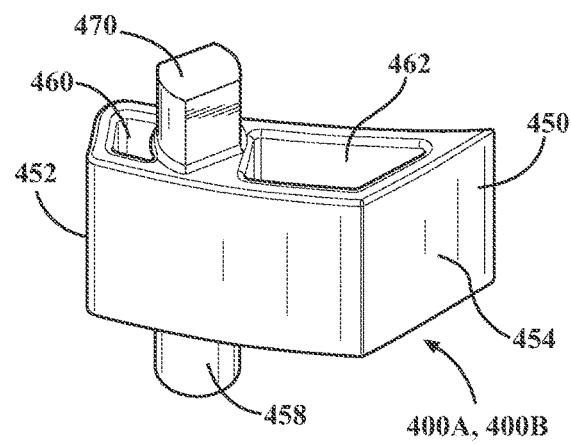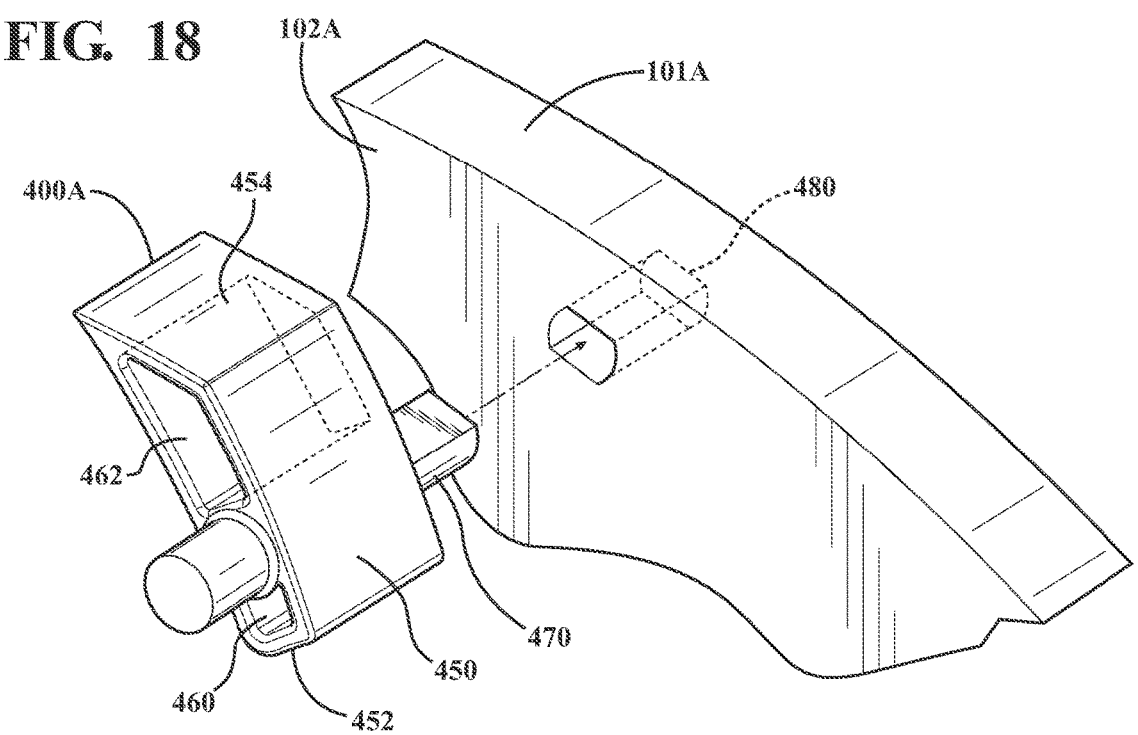

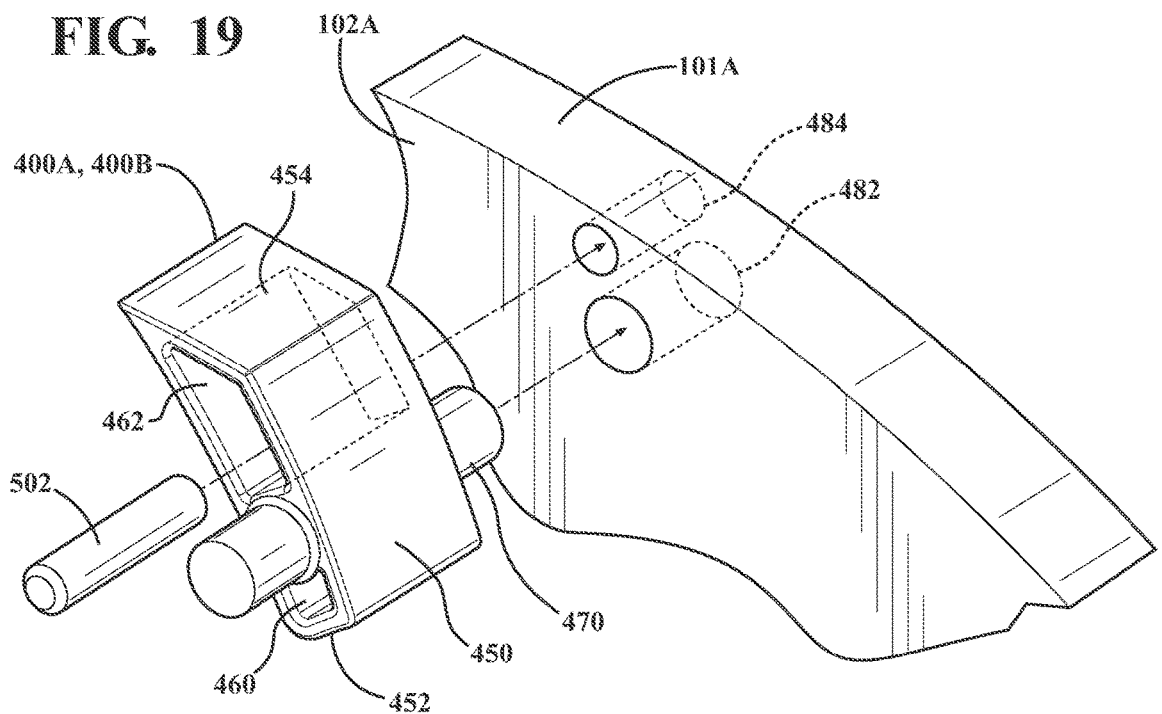
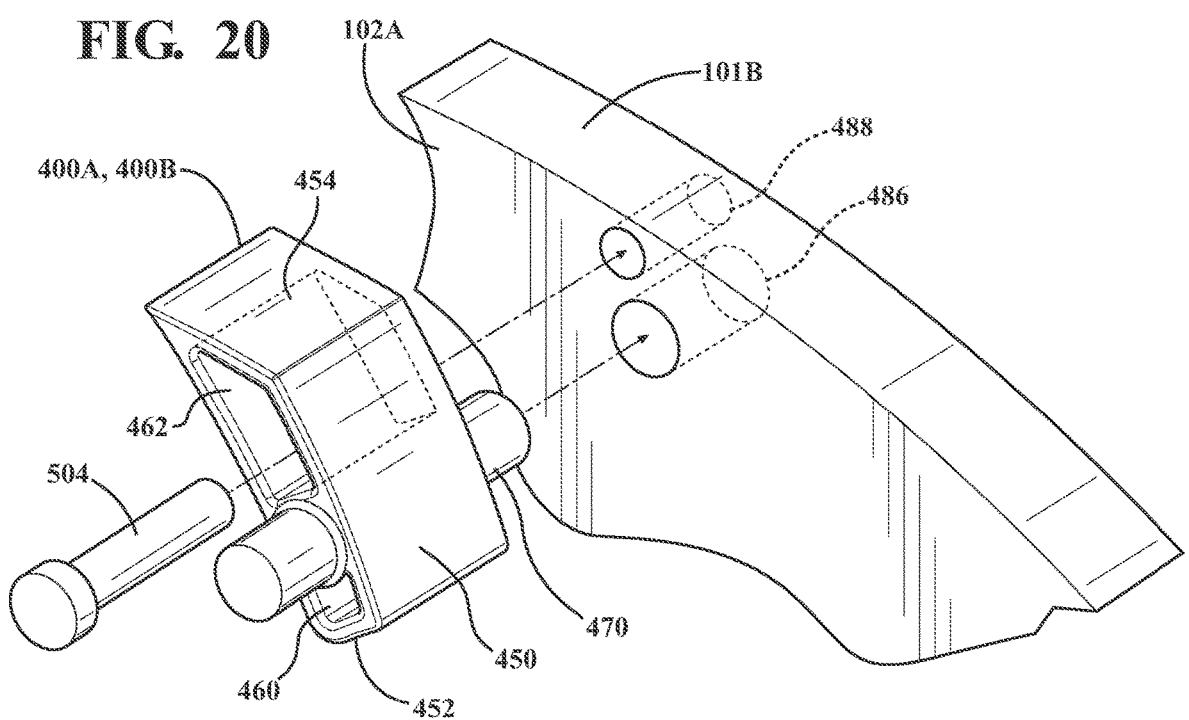

ENTRYWAY SYSTEM INCLUDING A DIVIDED VOLUTE TURBOCHARGER HAVING VARIABLE TURBINE GEOMETRY WITH AERODYNAMIC SPACERS AND VANE RING WITH PLURALITY OF ROTATABLE VANES

CROSS REFERENCE TO RELATED APPLICATIONS

This application claims priority pursuant to 35 U.S.C. 119(a) to U.S. Provisional App. Ser. No. 63/075,581, filed Sep. 8, 2020, which application is incorporated herein by reference in its entirety.

FIELD OF THE INVENTION

This invention relates generally to an entryway system including a divided volute turbocharger having variable turbine geometry and including aerodynamic spacers and a vane ring having a plurality of rotatable vanes, with the aerodynamic spacers and vane pattern of the vane rings providing the turbocharger with generally equalized flow symmetry and decreased high cycle fatigue.

DESCRIPTION OF THE RELATED ART

Turbochargers receive exhaust gas from an internal combustion engine and deliver compressed air to the internal combustion engine. Turbochargers increase the power output of the internal combustion engine, lower fuel consumption of the internal combustion engine, and/or reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Some turbochargers include a turbine having a divided volute turbine housing, with the turbochargers therefore sometimes alternatively referred to as a divided volute turbocharger (or, when two volutes are utilized, a dual volute turbocharger). The volutes of a divided volute turbine housing are generally isolated from one another such that no mixing of exhaust gas occurs until after the exhaust gas passes the tongues of the respective volutes. The divided volute turbine housing includes a turbine inlet, a turbine outlet, and an interior volume. The turbine inlet is configured for attachment to an internal combustion engine (e.g., to an exhaust manifold or to a cylinder head of an internal combustion engine) and includes a plurality of inlet ports configured to be in fluid communication with exhaust paths of the internal combustion engine upon attachment. The interior volume of the turbine housing defines at least two divided volutes in fluid communication with the respective inlet ports for delivering exhaust gas from the internal combustion engine to a turbine wheel disposed in the interior volume. After energy is extracted from the exhaust gas by the turbine wheel, the exhaust gas exits the turbine housing via the turbine outlet. The volutes guide the exhaust gas from the exhaust manifold of the engine into an arcuate flow for distribution of exhaust around the circumference of the turbine wheel to rotate the turbine wheel.

Turbochargers also include a compressor. The compressor includes a compressor wheel coupled to the turbine wheel via a shaft. The compressor is powered by the rotation of the turbine wheel, which in turn drives a compressor wheel within a compressor housing of the compressor.

In multi-cylinder engines, cylinders fire in a specific order. For example, in an inline four-cylinder engine in which the cylinders are sequentially numbered 1 through 4, the firing order may be 1-3-4-2. A collection of cylinders may be grouped into a 'bank'. In the above example, a first bank of cylinders would include cylinders 1 and 4 and a second bank of cylinders would include cylinders 2 and 3. In the case of a "V" engine, the banks of cylinders can be separated across the engine, and multiple cylinders may be firing at the same time. In the case of an inline engine, the banks of cylinders could simply be the front cylinders versus the back cylinders, or an alternate collection of cylinders as described above. Exhaust gas flow is not a smooth stream because exhaust gases exit each cylinder based on the engine's firing sequence, resulting in intermittent exhaust gas pulses. The exhaust gas from each bank is conducted to the turbine housing in respective manifolds. The manifolds may be pipes and/or ducts attached to the internal combustion engine or may be integral to the internal combustion engine (e.g., manifold ducts cast into a cylinder head of the engine). By separating the exhaust gas streams, the "pulses" of pressure that occurs when the exhaust gas is released from the cylinder may be preserved through the volutes such that the pressure pulses impinge on the turbine wheel. The preservation of the pulses is typically desirable because the pressure pulse imparts momentum to the turbine wheel, thereby accelerating the turbine wheel faster and reducing turbo lag. Effective separation of the gas streams also reduces the instantaneous backpressure in the "non fired" volute. The term "fired" volute refers to the volute with the pressure pulse passing through it. This separation of pulse begins at the exhaust of each cylinder and is maintained in the exhaust manifold up to the turbine inlet (sometimes alternatively referred to as a turbine inlet scroll). In the region where the exhaust gases are admitted to the turbine housing, a separator wall between the respective volutes can help preserve the separation between exhaust gases from each cylinder or cylinder group, and thus maintain the pressure pulses.

To aid in directing and controlling the exhaust flow from the volute or divided volutes to the turbine wheel uniformly, a vane ring (sometimes alternatively referred to as a nozzle ring or vaned nozzle stator) with a plurality of vanes can be disposed on an annular disk in the turbine housing interior between the volutes and turbine wheel. These vanes can be fixed to the annular disk (sometimes alternatively referred to as a fixed nozzle ring or fixed vaned nozzle stator), or can be rotatably coupled to the annular disk (sometimes alternatively referred to as a variable nozzle ring or variable vaned nozzle stator) to create a variable turbine geometry (VTG).

Typically, the rotatable vanes on the vane ring are equally spaced relative to each other and are each positioned at the same radial distance relative to the axis of rotation of the turbine wheel. Still further, such rotatable vanes are typically equally angled relative to a radial line drawn from the axis of rotation. Typically, the number of rotatable vanes disposed on the vane ring is an odd number, such a prime number, which therein provides a degree of asymmetry along the vane ring associated with the odd number of equally spaced vanes.

As such, there remains a need to optimize the configuration of rotatable vanes on the vane ring for use in turbochargers having VTG, and in particular for use in divided volute turbochargers having VTG, that provide generally equalized flow symmetry in each volute emission while decreasing high cycle fatigue (HCF) forcing function.

SUMMARY OF THE INVENTION AND ADVANTAGES

An entryway system includes a divided volute turbocharger for receiving exhaust gas from an internal combustion engine and for delivering compressed air to the internal combustion engine. The internal combustion engine includes a first set of cylinders and a second set of cylinders, with a relative pulse of the exhaust gas delivered from the first and second set of cylinders being generally equal for each exhaust stroke.

The divided volute turbocharger includes a turbine housing including a turbine housing interior adapted to receive a turbine wheel having a plurality of equally spaced turbine blades. The turbocharger also includes a first volute adapted for fluid communication with the internal combustion engine and the turbine housing interior for delivering exhaust gas from the first set of cylinders to the turbine housing interior, and a second volute adapted for fluid communication with the internal combustion engine and the turbine housing interior for delivering exhaust gas from the second set of cylinders to the turbine housing interior independently of the first volute. The turbocharger also includes a turbine housing outlet in fluid communication with the turbine housing interior, and a wall separating the first volute from the second volute and including a first tongue and a second tongue spaced from the first tongue.

The entryway system also includes a vane ring disposed in the turbine housing interior between the first and second volutes and around the turbine wheel, the vane ring comprising an annular disk including a vane ring surface disposed between an inner circumferential ring and an outer circumferential ring with the inner circumferential ring defining an orifice for receiving the turbine wheel, with first and second tongue each separately terminating at a position adjacent to the outer circumferential ring, and with the vane ring surface including a plurality of vanes. The plurality of vanes have a symmetric or asymmetric vane pattern and includes a first set of vanes comprising a plurality of vanes rotatably disposed in a spaced apart manner along a first arcuate region of the vane ring surface, and a second set of vanes comprising a plurality of vanes disposed in a spaced apart manner along a second arcuate region of the vane ring surface, with the second set of vanes and the first set of vanes rotatably disposed on the vane ring surface to define the symmetric vane pattern or asymmetric vane pattern. In certain embodiments, the second set of vanes is disposed differently than the first set of vanes to define the asymmetric vane pattern.

The entryway system also includes a plurality of spacers disposed in a spaced apart manner on the vane ring surface and positioned circumferentially outward from each vane of the first and second set of vanes, with a first one of the plurality of spacers positioned adjacent to the first tongue and with a second one of the plurality of spacers positioned adjacent to the second tongue, with the first one and the second one of the plurality of spacers defining the first arcuate region and the second arcuate region along the vane ring surface.

The first set of vanes defines a first vane flow parameter in an area located between the first arcuate region and an interior surface of the turbine housing downstream of the first volute for receiving the relative pulse of exhaust gas from the first volute corresponding to an exhaust stroke of the first group of cylinders. In addition, the second set of vanes defines a second vane flow parameter in an area located between the second arcuate region and the interior surface of the turbine housing downstream of the second volute for receiving the relative pulse of exhaust gas from the second volute corresponding to an exhaust stroke of the second group of cylinders. Still further, the first volute defines a first volute flow parameter for the relative pulse of exhaust gas received from the first group of cylinders, while the second volute defines a second volute flow parameter for the relative pulse of exhaust gas received from the second group of cylinders. The entryway system includes wherein the first volute flow parameter in series combination with the first vane flow parameter defines a first total flow parameter, and wherein the second volute flow parameter in series combination with the second vane flow parameter defines a second total flow parameter; and wherein the value of the first total flow parameter is generally equal to the value of the second total flow parameter, such as wherein the value of the first total flow parameter is within twenty percent of the value of the second total flow parameter.

The vane ring includes wherein the vane spacing ($\beta$) and/or the vane pitch circle radius ($\phi/2$) of the plurality of vanes disposed on the vane ring are varied to direct and control the flow of exhaust from the volutes into the turbine wheel with generally equal flow while significantly reducing HCF forcing function.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 15B is another end view of FIG. 15A with the plurality of vanes rotated to a 60% open intermediate position;

FIG. 15C is another end view of FIG. 15A with the plurality of vanes rotated to an open position;

FIG. 16 is a perspective view of one of the aerodynamic spacers in accordance with one alternative embodiment for use as one of the aerodynamic spacers aligned with the corresponding one of the first and second tongue of the walls of the divided volute in any one of the embodiments of FIGS. 2 and 13-15;

FIG. 17 is a perspective view of one of the aerodynamic spacers in accordance with another alternative embodiment for use as one of the aerodynamic spacers aligned with the corresponding one of the first and second tongue of the walls of the divided volute in any one of the embodiments of FIGS. 2 and 13-15;

FIG. 18 is a perspective view of the coupling of the aerodynamic spacer of FIG. 17 coupled to a first annular disk of the vane ring of FIGS. 2-6 and 13-15;

FIG. 19 is a perspective view of the coupling of the aerodynamic spacer of FIG. 17 coupled to a second annular disk of the vane ring of FIGS. 2-6 and 13-15; and FIG. 20 is a perspective view of the coupling of the aerodynamic spacer of FIG. 17 coupled to a second annular disk of the vane ring of FIGS. 2-6 and 13-15.

DETAILED DESCRIPTION OF THE INVENTION

Figure 1:
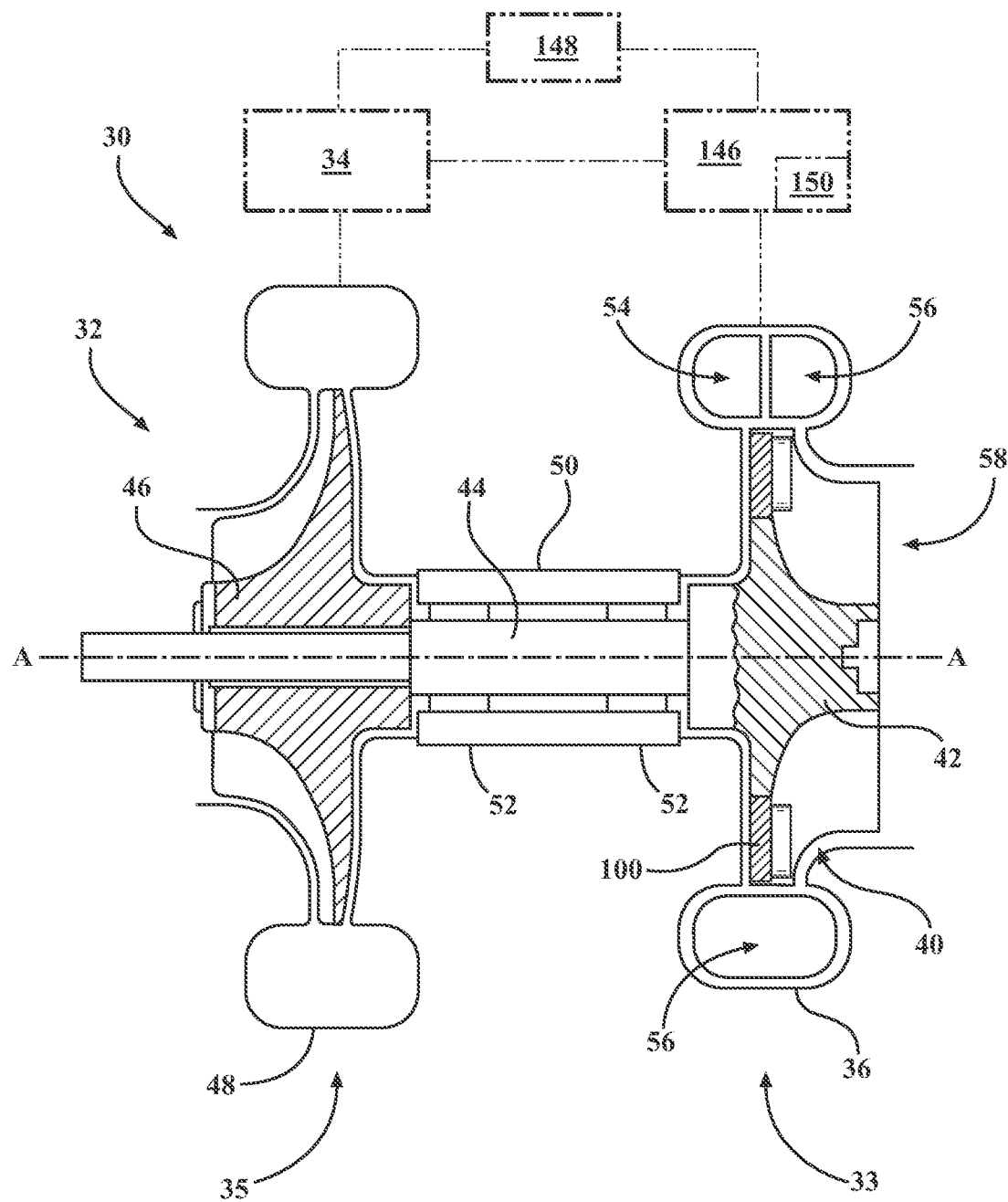
FIG. 1 is a schematic representation of a system including a turbocharger having variable turbine geometry and having a dual volute turbine housing, turbine wheel disposed in the turbine housing.

With reference to the Figures, wherein like numerals indicate like parts throughout the several views, a schematic representation of a system 30 (i.e., an entryway system 30) is shown in FIG. 1. The system 30 includes a turbocharger 32 having a turbine portion 33 for receiving exhaust gas from an internal combustion engine 34 and a compressor portion 35 for delivering compressed air to the internal combustion engine 34. Although not required, the turbocharger 32 is typically used in passenger and commercial automotive applications. However, it is to be appreciated that the turbocharger 32 may be used in non-automotive applications such as heavy equipment applications, non-automotive diesel engine applications, non-automotive motor applications, and the like.

The turbine portion 33 includes a turbine housing 36 having an interior surface 38 defining the turbine housing interior 40. The turbine housing interior 40 is adapted to receive a turbine wheel 42 having a plurality of turbine blades 45 (see FIG. 2), here a plurality of evenly spaced turbine blades 45. In addition, the turbocharger 32 typically includes a turbocharger shaft 44, a compressor wheel 46, a compressor housing 48, and a bearing housing 50. During operation of the turbocharger 32, the turbine wheel 42 (and in particular the turbine blades 45 of the turbine wheel 42) receives exhaust gas from the internal combustion engine 34 which causes the turbine wheel 42 to rotate. When present, the turbocharger shaft 44 is coupled to and rotatable by the turbine wheel 42. When present, the compressor wheel 46 is disposed in the compressor housing 48, is coupled to the turbocharger shaft 44, and is rotatable by the turbocharger shaft 44 for delivering compressed air to the internal combustion engine 34. The bearing housing 50 extends about the turbocharger shaft 44 between the turbine wheel 42 and the compressor wheel 46. The turbocharger 32 also typically includes bearings 52 disposed about the turbocharger shaft 44 and in the bearing housing 50 for rotatably supporting the turbocharger shaft 44.

The interior surface 38 of the turbine housing 36 defines a plurality of volutes separated by walls, and hence the turbine housing 36 is defined as a divided volute turbine housing. In one exemplary embodiment, as shown in FIGS. 2-7, the divided volute turbine housing 36 is a dual volute turbine housing 36, and hence the interior surface 38 defines a first volute 54 and a second volute 56 that are respectfully separated by a wall 60. The wall 60 includes first and second tongues 61, 63, which represent different portions of the wall 60 spaced from each other that separates portions of the first and second volutes 54, 56.

For ease of description herein after, the turbocharger 32 will be further explained as including a dual volute turbine housing 36. However, embodiments of turbine housings having additional numbers of volutes (e.g., three volutes or four volutes) are within the scope described herein.

The first and second volutes 54, 56 are each in fluid communication with the internal combustion engine 34 and the turbine housing interior 40 for delivering exhaust gas from the internal combustion engine 34 to the turbine housing interior 40. As also shown in FIGS. 1, 3, 4, and 6-7, the interior surface 38 also defines a turbine housing outlet 58. The turbine housing outlet 58 is in fluid communication with the turbine housing interior 40 for discharging exhaust gas from the turbine housing interior 40. In addition, the inner surface 38 also defines a wastegate 71 fluidically coupling each or either of the first and second volutes 54, 56 to the turbine housing outlet 58. The turbine housing 36 may be comprised of any suitable metal. Typically, the turbine housing 36 is comprised of iron or a steel alloy.

Figure 2:
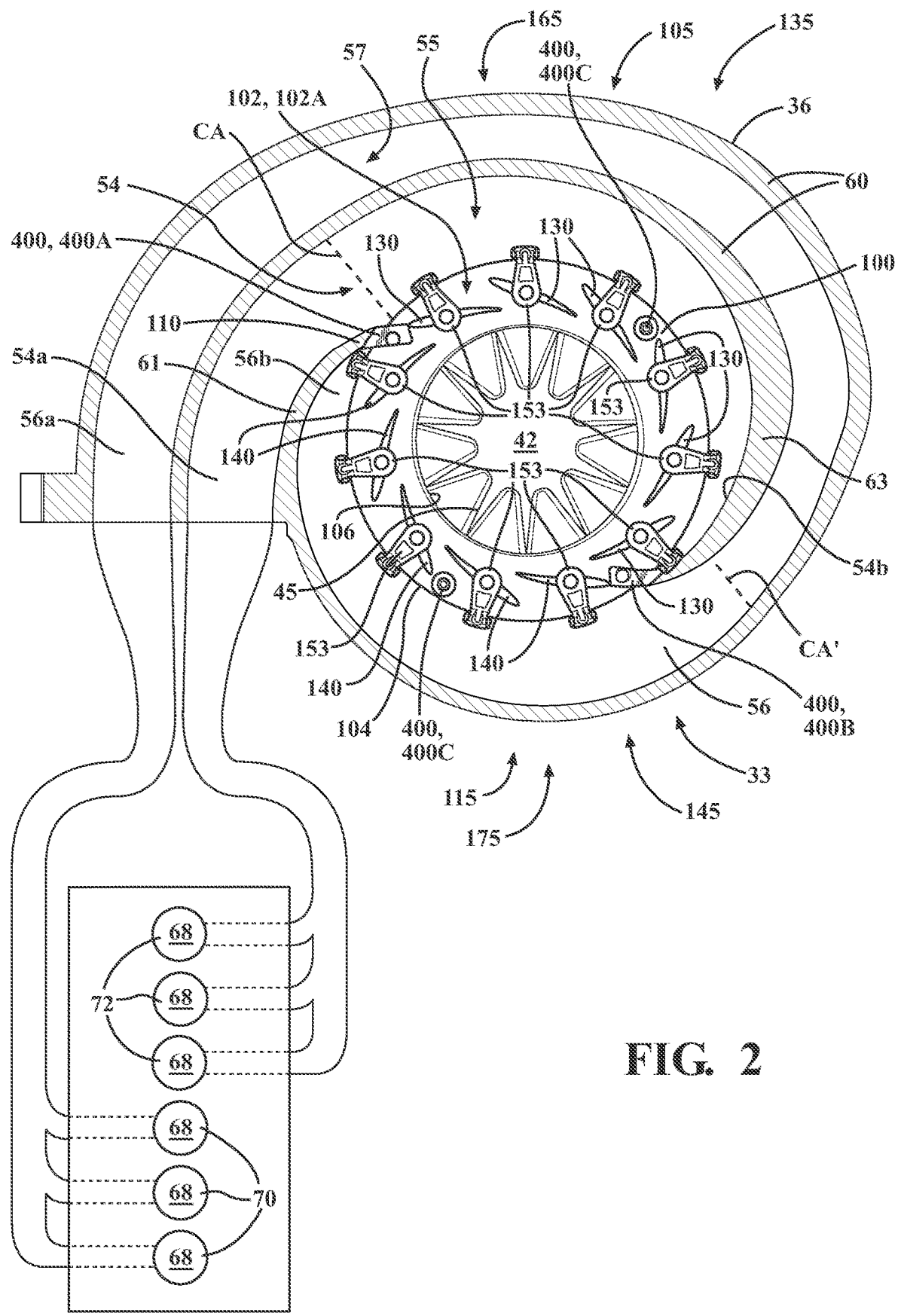
FIG. 2 is a schematic representation of an internal combustion engine and a cross-sectional end view of the dual volute turbine housing of FIG. 1 adapted for fluid communication with an internal combustion engine that also includes a portion of a vane ring having rotatable vanes disposed on an annular disk and aerodynamic spacers.
Figure 3:
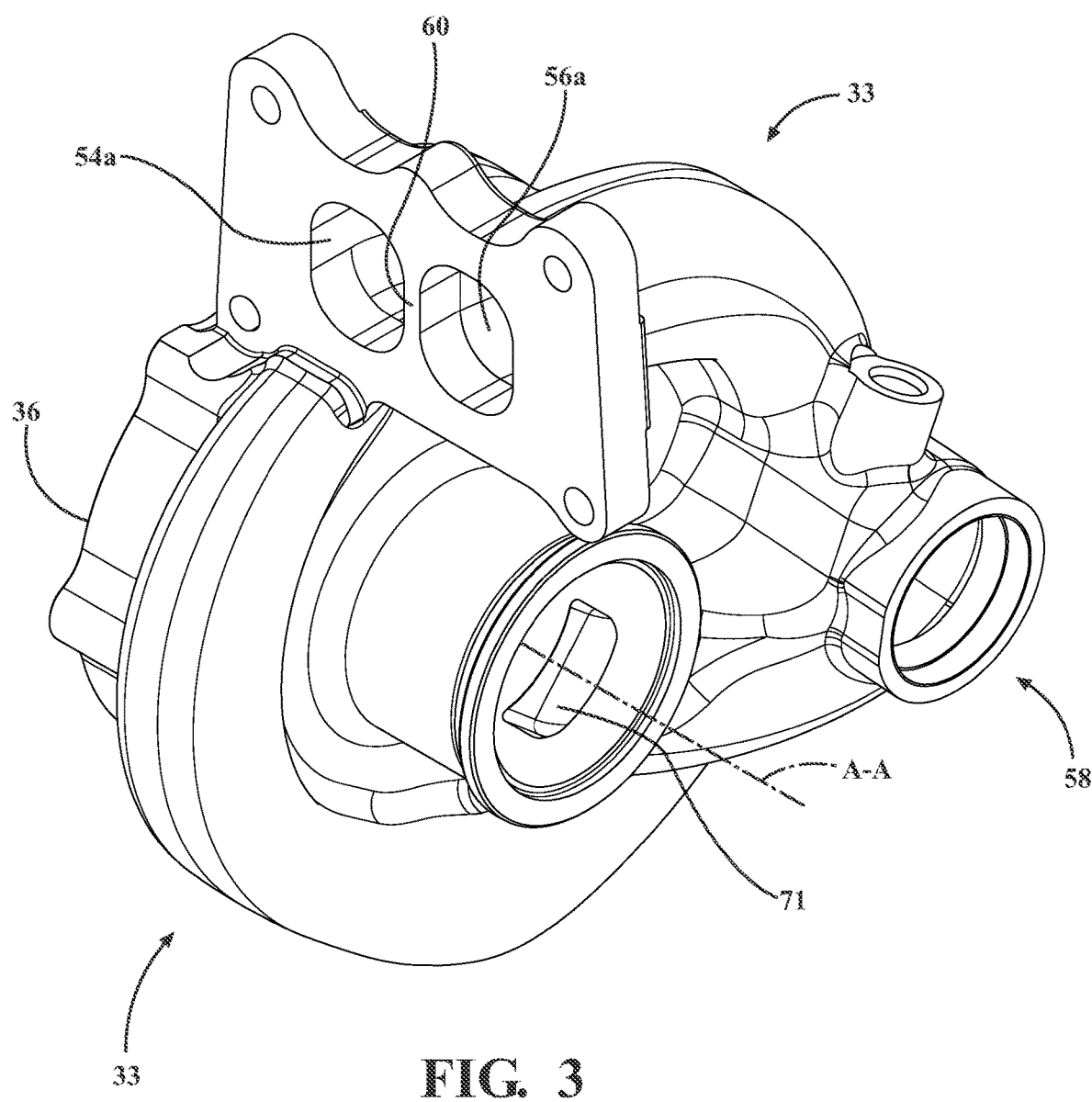
FIG. 3 is a side perspective view of the turbine portion of the turbocharger of FIGS. 1 and 2 without the turbine wheel and turbocharger shaft.
Figure 4:
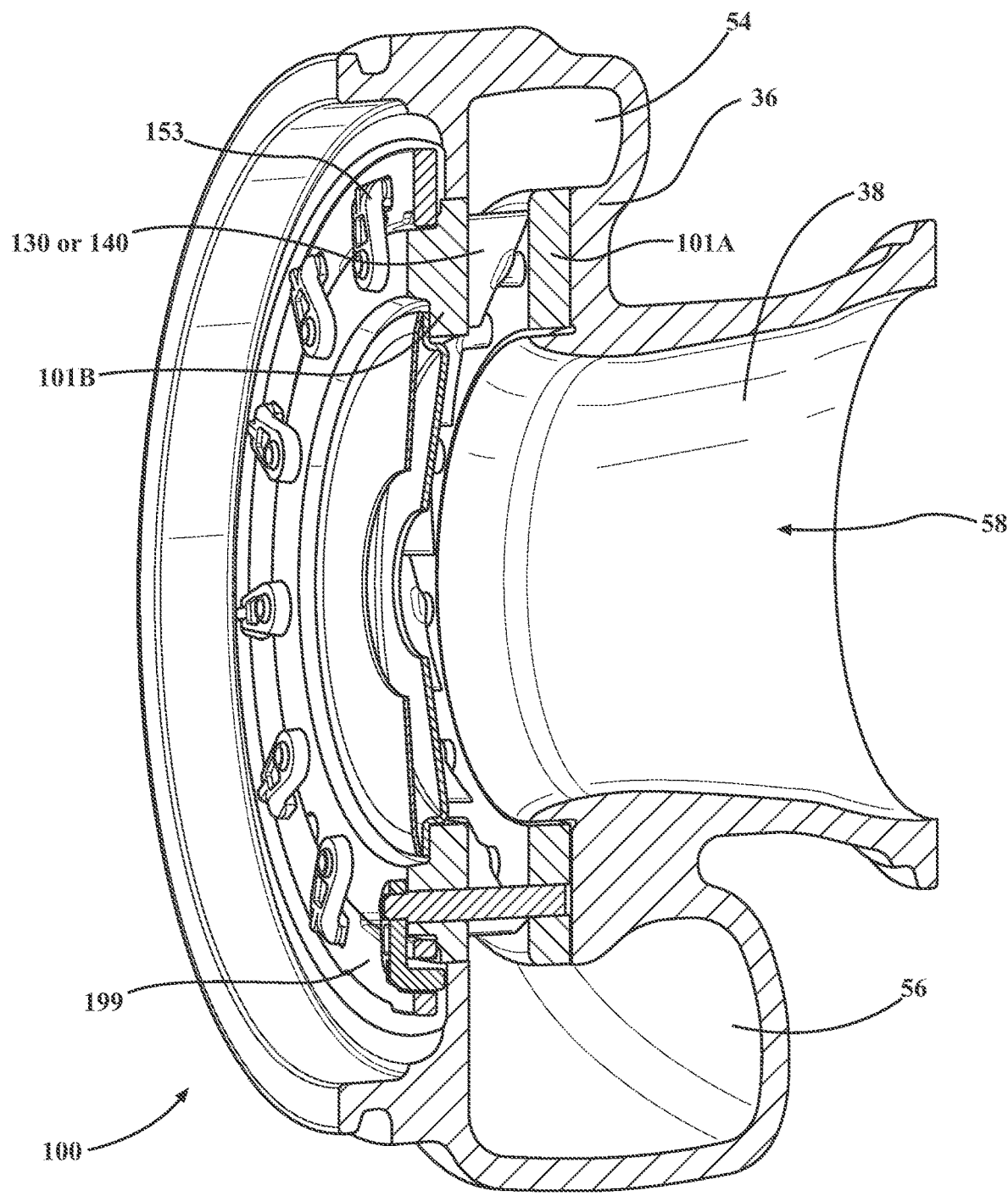
FIG. 4 is a side section view of a portion FIG. 3.

With reference again to FIG. 2, the internal combustion engine 34 includes a plurality of cylinders 68. In the illustrated embodiment, the internal combustion engine 34 includes six cylinders 68. However, it is to be appreciated that the internal combustion engine 34 may include any number of cylinders 68. For example, the internal combustion engine 34 may include two cylinders 68, four cylinders 68, six cylinders 68, eight cylinders 68, or more cylinders 68. The internal combustion engine 34 may also include an odd number of cylinders (e.g., three cylinders 68 or five cylinders 68). The internal combustion engine 34 may have a V-engine configuration, a flat/boxer engine configuration, a W-engine configuration, an inline engine configuration, and the like. In the illustrated embodiment, the internal combustion engine 34 has an inline engine configuration. The internal combustion engine 34 includes a first group of cylinders 70 and a second group of cylinders 72. In the illustrated embodiment, the first and second groups of cylinders 70, 72 each include half of the cylinders 68 that are included in the internal combustion engine 34. For example, when the internal combustion engine 34 includes six cylinders 68 as shown in FIG. 2, the first group of cylinders 70 includes three of the cylinders 68 and the second group of cylinders 72 includes the other three of the cylinders 68. The first and second groups of cylinders 70, 72 produce exhaust gas in a series of pulses corresponding to an exhaust stroke of each of the first and second groups of cylinders 70, 72. Timing of the exhaust strokes of the cylinders 68 is such that pulses of exhaust gas are alternately emitted from the first group of cylinders 70 and the second group of cylinders 72. The area of the first volute 54, in combination with the produced gas from the exhaust stroke of the first set of cylinders 70, defines a first volute flow parameter 55. Similarly, the corresponding area of the second volute 56, in combination with the produced gas from the exhaust stroke of the second set of cylinders 72, defines a second volute flow parameter 57. The volute flow parameter δ for a volute (such as the first and second volute flow parameter 55, 57 of the respective first and second volute 54, 56 (as provided herein)) is calculated by the equation:

$$\delta = \frac{\dot{m}\sqrt{T}}{P}$$

wherein m is the mass flow through the volute, T is the exhaust gas temperature at the inlet of the volute, and P is the exhaust gas pressure at the inlet of the volute. Typically, the volute flow parameter δ is measure for each respective exhaust stroke of the respective one of the first and second set of cylinders 70, 72.

With continued reference to FIG. 2, typically the first group of cylinders 70 are in fluid communication with the first volute 54 and the second group of cylinders 72 are in communication with the second volute 56. In this manner, pulses of exhaust gas from the first and second groups of cylinders 70, 72 flow through the first and second volutes 54, 56, respectively, and to the turbine housing interior 40, where the pulses of exhaust gas rotate the turbine wheel 42. The respective pulses of exhaust gas flowing through the first volute 54 from the first group of cylinders 70 (typically measured for each exhaust stroke) and area of the first volute 54 define a first volute flow parameter 55, while the respective pulses of exhaust gas flowing through the second volute 56 from the second group of cylinders 72 (again typically measured for each exhaust stroke) and area of the second volute 56 define a second volute flow parameter 57. Owing to the difference in sizes of the areas of the first and second volutes 54, 56, the first and second volute flow parameters 55, 57 are generally different from one another, such as shown in FIG. 2.

In addition to the turbocharger 32, as also shown in FIG. 2, the entryway system 30 also includes a vane ring 100 disposed in the turbine housing interior 40 between the first and second volutes 54, 56 and around the turbine wheel 42, with the vane ring having plurality of vanes, shown as first and set of vanes 130 and 140, rotatably disposed to the vane ring 100 in an asymmetric vane pattern. The entryway system 30 also includes a plurality of spacers 400 disposed in a spaced apart manner on the vane ring 100, with the vanes on the vane ring 100 and spacers 400 functioning to control the flow of exhaust gas flowing from the one or more volutes 54, 56 to the turbine wheel 42. In particular, the spacers 400 function to minimize flow disturbance of exhaust gas flowing from the one or more volutes 54, 56 to the turbine wheel 42.

The vane ring 100 includes an annular disk 101 disposed in the turbine housing interior 40 between the divided first and second volutes 54, 56 and the turbine wheel 42. The vane ring 100 includes the plurality of vanes (shown as first and set of vanes 130 and 140 in FIG. 2) rotatably disposed to the vane ring 100 in either a symmetric vane pattern or an asymmetric vane pattern. In certain embodiments (see FIG. 5 for example), the vane ring 100 includes two spaced apart annular disks 101A, 101B (the annular disk 101A may sometimes referred to as a first annular disk 101A or lower annular disk 101A, while disk 101B may sometimes referred to as a second annular disk 101B or upper annular disk 101B), which the plurality of vanes 130, 140 rotatably disposed between the vane rings 100A, 100B in the aforementioned symmetric or asymmetric pattern. In these embodiments, the spacers 400 also function to provide an axial separation function between the first and second annular disks 101A, 101n.

The annular disk 101 includes a vane ring surface 102 which includes an inner vane ring surface 102A and an opposing outer vane ring surface 102B (see FIG. 5) extending between an inner circumferential edge 104 and an outer circumferential edge 106. The inner circumferential edge 104 defines a circular orifice for receiving the turbine wheel 42 of the turbocharger 32. In particular, the vane ring 100 is disposed in the turbine housing 36 with the first and second tongue 61, 63 each separately terminating at a position adjacent to the outer circumferential ring 106.

As shown for example in FIG. 2, the first set of vanes 130 (i.e., a first set of at least two vanes 130) are rotatably disposed in a spaced apart manner from one another on the vane ring surface 102 such that the first set of vanes 130 are positioned downstream of the first volute 54. Still further, the second set of vanes 140 are rotatably disposed in a spaced apart manner from one another such that the second set of vanes 140 (i.e., a second set of at least two vanes 140) are positioned downstream of the second volute 56. Each of the vanes 130, 140 are rotatable along the vane ring surface 102, and in particular are rotatable along the inner vane ring surface 102A of a respective vane ring 100, 100A, 100B about a vane pivot axis (corresponding to a vane pivot point VPP—see FIG. 7) between a closed position and an open position and through one or more intermediate positions between the closed and open position (the open, closed and one intermediate position are best illustrated and described with respect to FIGS. 12-16 below). The vane pivot axis VPA as defined herein, extends in a direction normal to a plane defining the vane ring surface 102 of the vane ring 100.

In the embodiments illustrated in FIGS. 2-6, the first set of vanes 130 includes five vanes 130 positioned adjacent to one another of the vane ring surface 102 around the vane ring 100, while the second set of vanes 140 includes six vanes 140 positioned adjacent to one another of the vane ring surface 102 around the vane ring 100. Accordingly, there are a total of eleven vanes 130, 140 on the vane ring 102 in the embodiment of FIGS. 2-6, which provide exhaust flow to the turbine wheel 42 having a total of eleven equally spaced turbine blades 45. While the embodiments provided herein include eleven vanes 130, 140 and eleven turbine blades 45, alternative relative amounts of vanes and blades are contemplated, preferably wherein the number of vanes 130, 140 is an odd number, such as a prime number.

Figure 5:
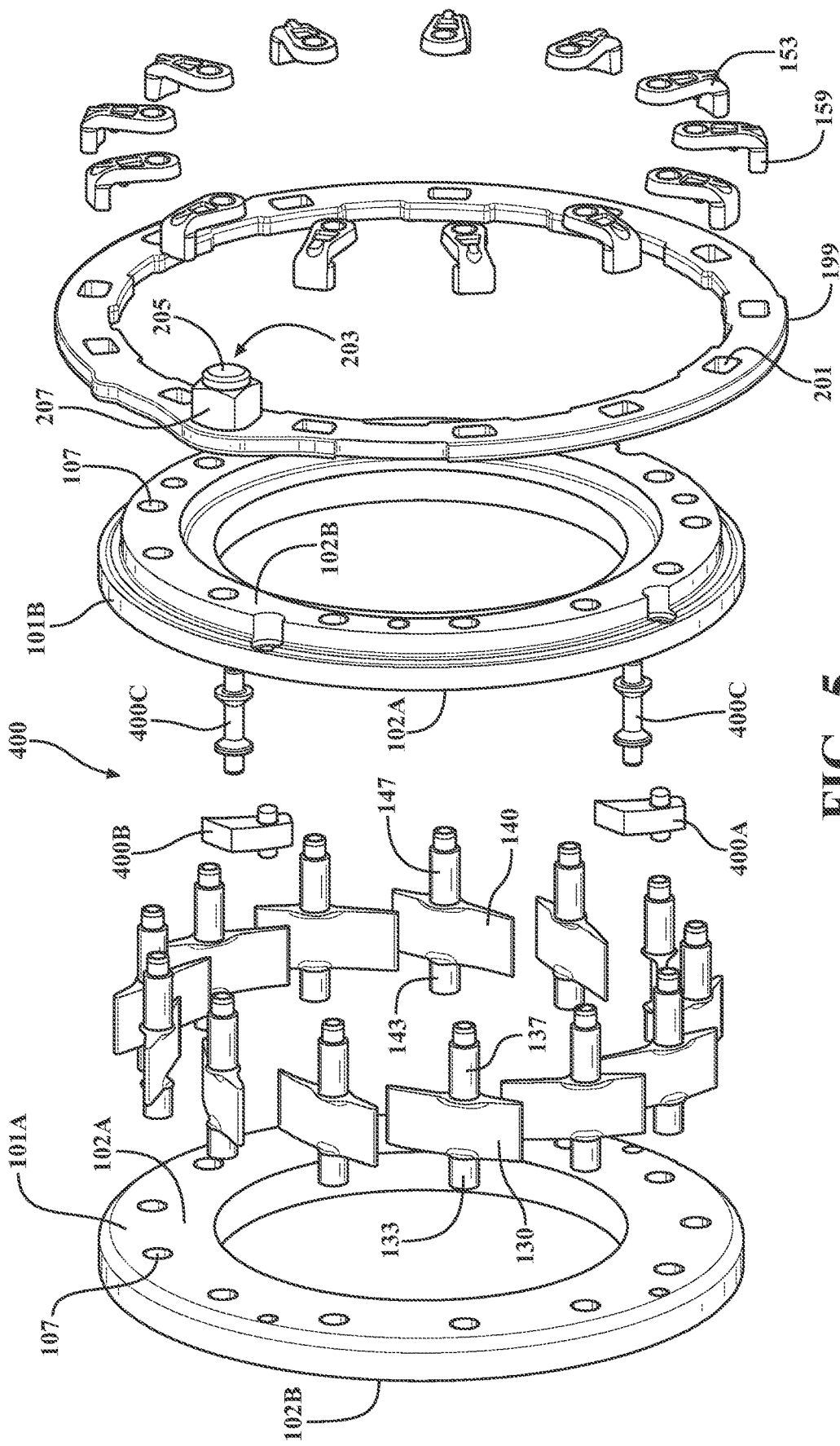
FIG. 5 is an exploded view of a portion of FIG. 2.
Figure 6:
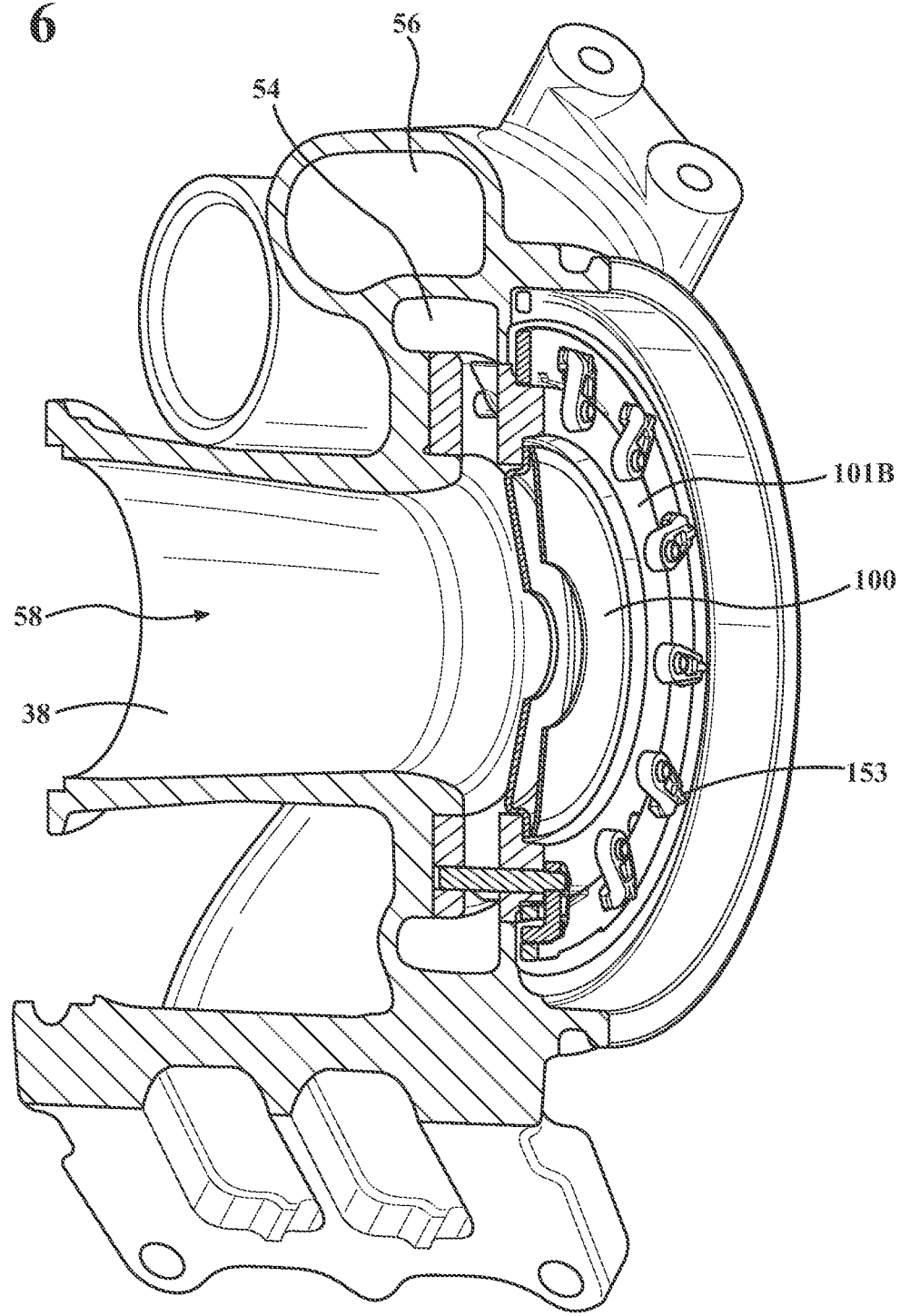
FIG. 6 is another partial section view of FIG. 3.
Figure 7:
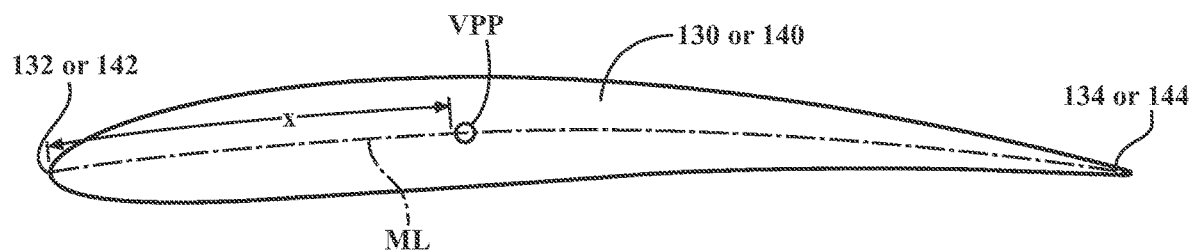
FIG. 7 is an end view of a vane of the vane ring, illustrating the vane pivot point (VPP) of the vane.

As best illustrated in FIG. 7, each of the vanes 130 and 140 extends in length between a leading edge 132, 142 and a trailing edge 134, 144. Further, as best illustrated in FIG. 5, each of the plurality of vanes 130, 140 also includes a first shaft 133, 143 and an opposing second shaft 137, 147 extending from opposing flat sides of the vanes 130, 140. A vane lever 153 is coupled, and preferably fixed via riveting or welding, to the second shafts 137, 147 of the vanes 130, 140 and also includes a flange portion 159. The vane levers 153 are configured to rotate each of the vanes 130 and 140 in a coordinated manner about their respective vane pivot point (VPP) between the closed position and the open position and through the one or more intermediate positions, as will be explained further below. In certain embodiments, such as shown in FIG. 5, an adjustment ring 199 is retained between the vane levers 153 and the second annular disk 101n, with the flange portion 159 of each of the vane levers 153 disposed within an opening 201 in the adjustment ring 199. An assembly 203 including a pin 205 and block 207 is affixed to the adjustment ring 199, such as by riveting or welding, with a pivot having a pivot shaft (not shown) connecting the assembly 203. The pivot shaft is rotated by a linkage (not shown) connected to an actuator (not shown). The actuator rotates the linkage on the basis of a particular engine operating condition to adjust the flow of exhaust gas through the vanes 130, 140. In particular, the actuator rotates the linkage, which rotates the pivot shaft and adjustment ring 199 through the assembly 203. The rotation of the adjustment ring 199 causes the adjustment ring 199 to contact the flange portion 159 of the vane levers 153 and rotates the vane levers 153 in response, which in turn causes the coupled vanes 130, 140 to move between the closed and open positions and through one or more intermediate positions to adjust the flow of exhaust gas through the vanes 130, 140 on the basis of an engine operating condition, such as engine speed.

Each of the annular disks 101 also includes a plurality of first openings 107 are included within the inner vane ring surface 102A between the inner circumferential edge 104 and an outer circumferential edge 106, with the number of openings 107 corresponding to the number of the plurality of vanes 130, 140 and configured to receive a shaft 133, 137, 143, 147 of a respective one of the plurality of vanes 130, 140, as will be explained further below. The openings 107 therefore further define the vane pivot point (VPP) of the respective one vane of the plurality of vanes 130, 140 disposed therein. In embodiments that include the first and second annular disks 101A, 101B, the plurality of openings 107 in at least one the first and second annular disks 101A, 101B extend from the inner vane ring surface 102A to the outer vane ring surface 102B such that the entirety of the second shafts 137, 147 extends through the opening 107 of the second annular disk 101B such that the vane levers 153 are positioned within the turbine housing interior 40 between the outer vane ring surface 102B of the second annular disk 101B and the turbine housing 36.

Referring back to FIG. 2, and as noted above, the entryway system 30 also includes a plurality of spacers 400. In particular, the plurality of spacers 400 are disposed in a spaced apart manner on the vane ring surface 102 of the annular disk 101 of the vane ring 100 (or along the inner vane ring surface 102A of each of the spaced apart annular disks 101A, 101B) and positioned circumferentially outward from each vane of the first and second set of vanes 130, 140. The spacers 400 in conjunction with the vanes 130, 140, function to adjust the flow of exhaust gas entering from the respective first or second volute 54, 56 prior to being received by the turbine blades 45.

In the embodiment of FIG. 2 and in each of the representative embodiments of FIGS. 13-15 described below, a first one 400A of the plurality of spacers 400 is positioned adjacent to the first tongue 61 of the wall 60, while a second one 400B of the plurality of spacers is positioned adjacent to the second tongue 63 of the wall 60. The first one 400A and the second one 400B of the spacers 400 are also referred to as a first one 400A and the second one 400B of aerodynamic spacers, while each of the spacers 400C are alternatively referred to as an additional spacer 400C that are different from the aerodynamic spacers 400A, 400B. The term "adjacent to", as defined herein with respect to the relationship of the first one 400A and second one 400B of the spacers 400, refers to the positioning of the respective first one 400A or second one 400B of the spacers circumferentially outward of the vanes 130, 140 and along a radial line (RL) extending from the axis of rotation A-A of the turbine wheel 42 to the respective first or second tongue 61, 63. The respective first one 400A or second one 400B may be positioned adjacent to the outer circumferential ring 106 such that the respective first one 400A or second one 400B of the spacers 400 is aligned and generally flush to the respective first or second tongue 61, 63, or may be positioned slightly inward of the outer circumferential ring 106 so that a small gap may exist between the respective first one 400A or second one 400B of the spacers 400 and the respective first or second tongue 61, 63. In addition, the respective circumferentially inward most portion of the respective first one 400A or second one 400B are generally spaced circumferentially outward a sufficient distance from a respective adjacent one of the vanes 130, 140 to allow the vane 130, 140 to rotate between the open and closed position without encumbrance. Accordingly, as positioned in the entryway system 30, the first one 400A and the second one 400B of the plurality of spacers 400 define a first arcuate region 105 and a second arcuate region 115 therebetween along different portions of the vane ring surface 102 of the vane ring 100 (such as along different portions of the inner vane ring surface 102A of each of the spaced apart annular disks 101A, 101B), with the first arcuate region 105 defining the portion of the vane ring surface 102 (such as a portion of the inner vane ring surface 102A of each of the spaced apart annular disks 101A, 101B) that includes each of the first set of vanes 130 and the second arcuate region 115 defining the portion of the vane ring surface 102 (such as a portion of the inner vane ring surface 102A of each of the spaced apart annular disks 101A, 101B) that includes each of the second set of vanes 140. In addition to assisting in adjusting the flow of exhaust gas entering from the respective first or second volute 54, 56 prior to being received by the turbine blades 45, as noted above, the first one 400A and second one 400B of the spacers 400 function to reduce scroll to scroll leakage that occurs between one of the vanes 130, 140 and one of the respective tongues 61, 63 during operation of the entryway system 30 in each of the intermediate positions and open position as compared with entryway systems that do not include such spacers 400A, 400B.

In addition to the first one 400A and second one 400A of the spacers 400, in certain other embodiments, the plurality of spacers 400 may include a series of one or more additional spacers 400C positioned in either the first arcuate region 105 or the second arcuate region 115 between the first one 400A and second one 400B of the spacers 400. The one or more additional spacers 400C are typically in the form of circular posts and are generally spaced circumferentially outward a sufficient distance from a respective adjacent one of the vanes 130, 140 to allow the vane 130, 140 to rotate between the open and closed position without encumbrance. In addition, in certain embodiments, the one or more additional spacers 400C are typically also spaced from the outer circumferential ring 106, while in other embodiments the one or more additional spacers 400C may extend in length to the outer circumferential ring 106.

Accordingly, the area located between the first arcuate region 105 of vane ring surface 102 of the vane ring 100 and the interior surface 38 of the turbine housing 36 that is downstream of and adjacent to the first volute 54 defines a first vane flow parameter 135 corresponding to the exhaust gas received from the first volute 54 during an exhaust stroke of the first set of cylinders 70, while the area located between the second arcuate region 115 of the vane ring surface 102 of the vane ring 100 and the interior surface 38 of the turbine housing 36 that is downstream of and adjacent to the second volute 56 defines a second vane flow parameter 145 corresponding to the exhaust gas received from the second volute 56 during an exhaust stroke of the second set of cylinders 72.

In embodiments including pair of spaced apart annular disks 101A, 101B, the area located between the first arcuate region 105 of the inner vane ring surface 102A of the pair of spaced apart annular disks 101A, 101B that is downstream of and adjacent to the first volute 54 further defines the first vane flow parameter 135 corresponding to the exhaust gas received from the first volute 54 between the pair of annular disks 101A, 101B during an exhaust stroke of the first set of cylinders 70, while the area located between the second arcuate region 115 of the inner vane ring surface 102A of the pair of annular disks 101A, 101B that is downstream of and adjacent to the second volute 56 further defines the second vane flow parameter 145 corresponding to the exhaust gas received from the second volute 56 between the annular disks 101A, 101B during an exhaust stroke of the second set of cylinders 72.

Still further, the first vane flow parameter 135 in series combination with the first volute flow parameter 55 define a first total flow parameter 165, while the second vane flow parameter 145 in series combination with the second volute flow parameter 57 define a second total flow parameter 175.

In embodiments disclosed herein, the patterns (i.e., relative positioning or configuration) of first and second sets of vanes 130, 140 can be set such that exhaust gas flow impinging on the turbine wheel 42 through the first arcuate region 105 is different than the exhaust gas flow impinging on the turbine wheel 42 through the second arcuate region 115. Additionally, the embodiments disclosed herein may include further differences in gas flow impingement circumferentially within the first and second arcuate regions 105, 115. The different exhaust gas flow impingement characteristics through (and within) the first and second arcuate regions 105, 115 may reduce aerodynamic excitation effects on the turbine wheel 42 that can result in high cycle fatigue failure of a turbine wheel 42. Moreover, the patterns of the first and second tongue vanes 110, 120 and the first and second sets of vanes 130, 140 can be set to achieve desired first and second total flow parameters 165, 175. The exhaust gas flow impingement characteristics can be further adjusted the relative position of each of the plurality of vanes 130, 140 between the closed and the open position or in any one of the one or more intermediate positions.

Figure 8:
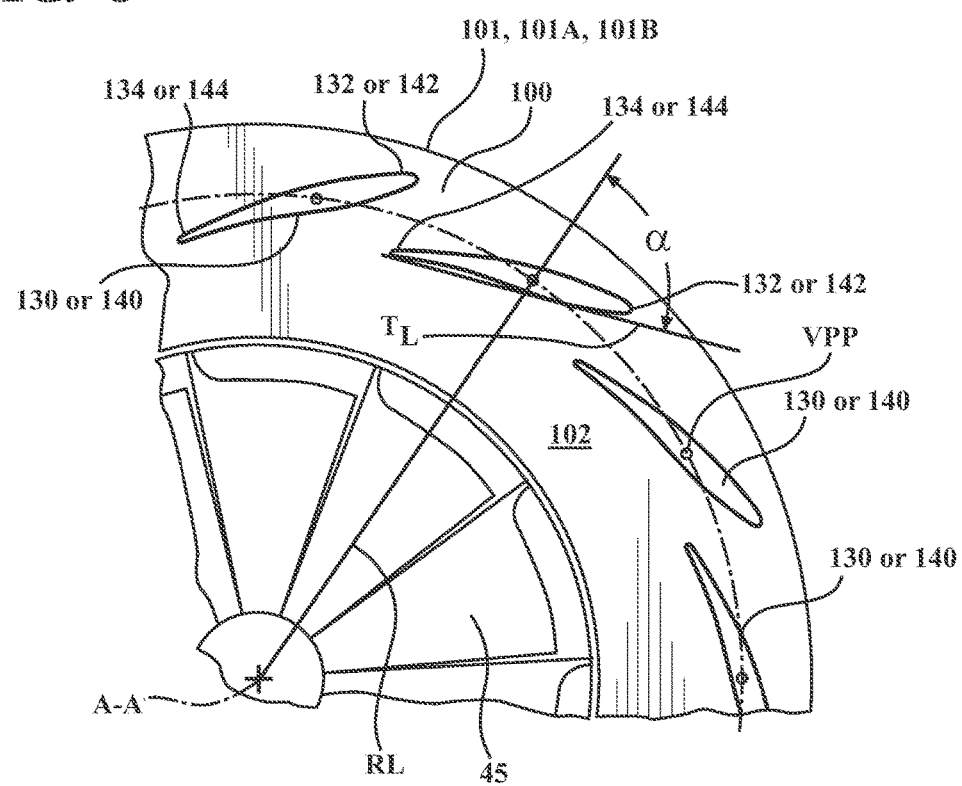
FIG. 8 is an end view of the turbine wheel and vane ring of FIG. 7 illustrating the vane angle ($\alpha$) of one of the vanes contained on the vane ring.
Figure 9:
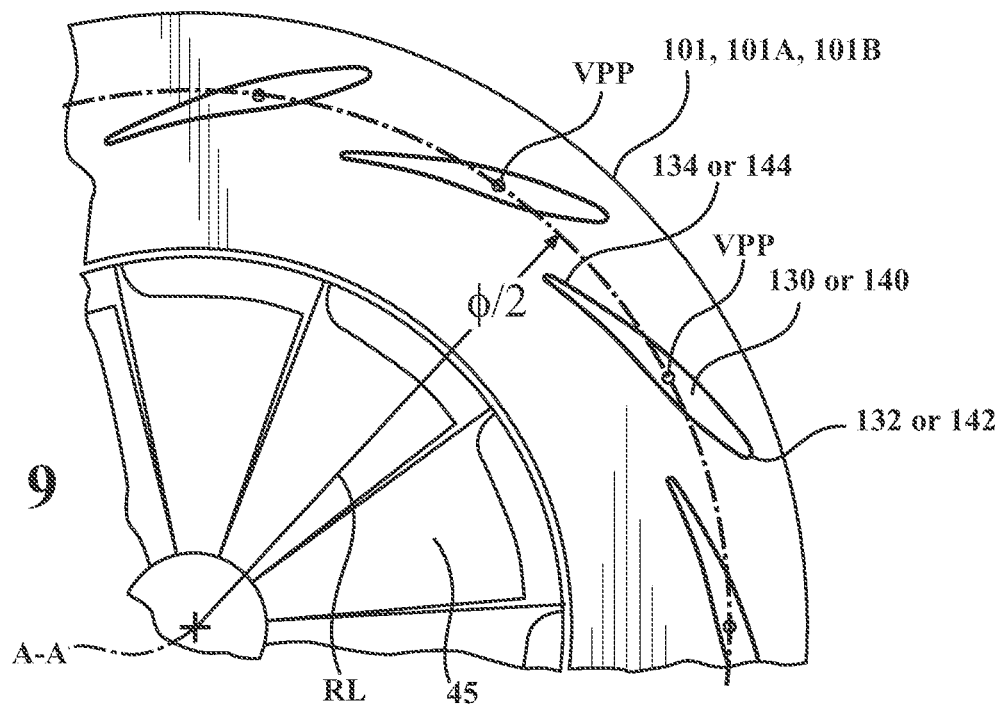
FIG. 9 is an end view of the turbine wheel and vane ring of FIG. 7 illustrating the vane pitch circle radius ($\phi/2$) of a plurality of the vanes contained on the vane ring.
Figure 10:
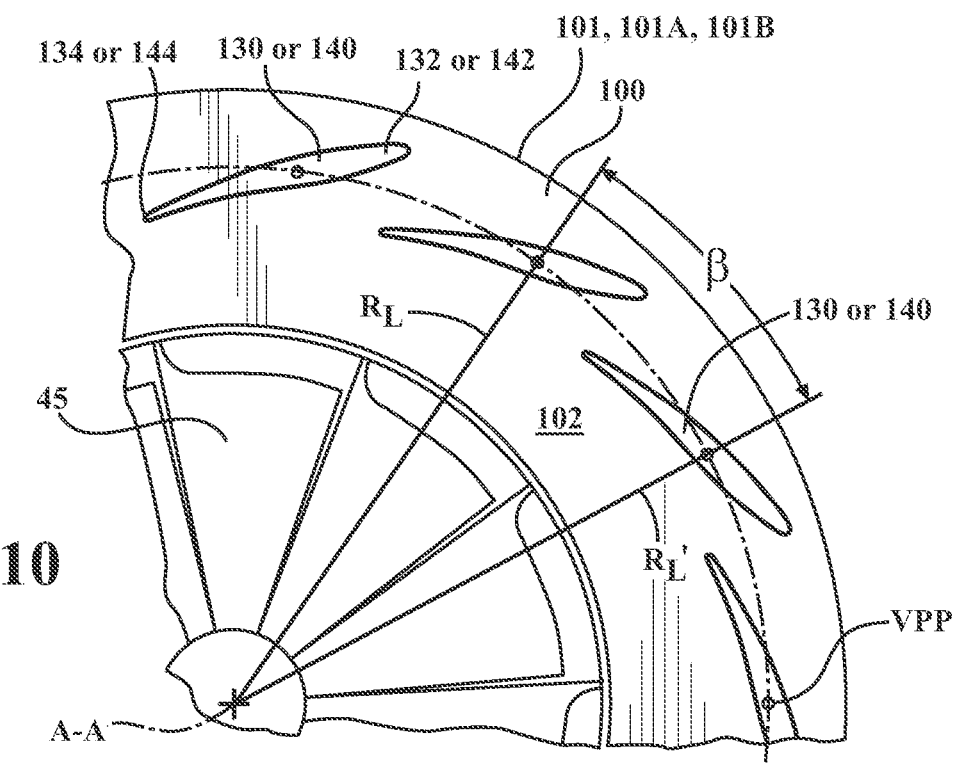
FIG. 10 is an end view of the turbine wheel and vane ring of FIG. 7 illustrating the vane spacing ($\beta$) of a respective adjacent pair of the vanes contained on the vane ring.
Figure 11:
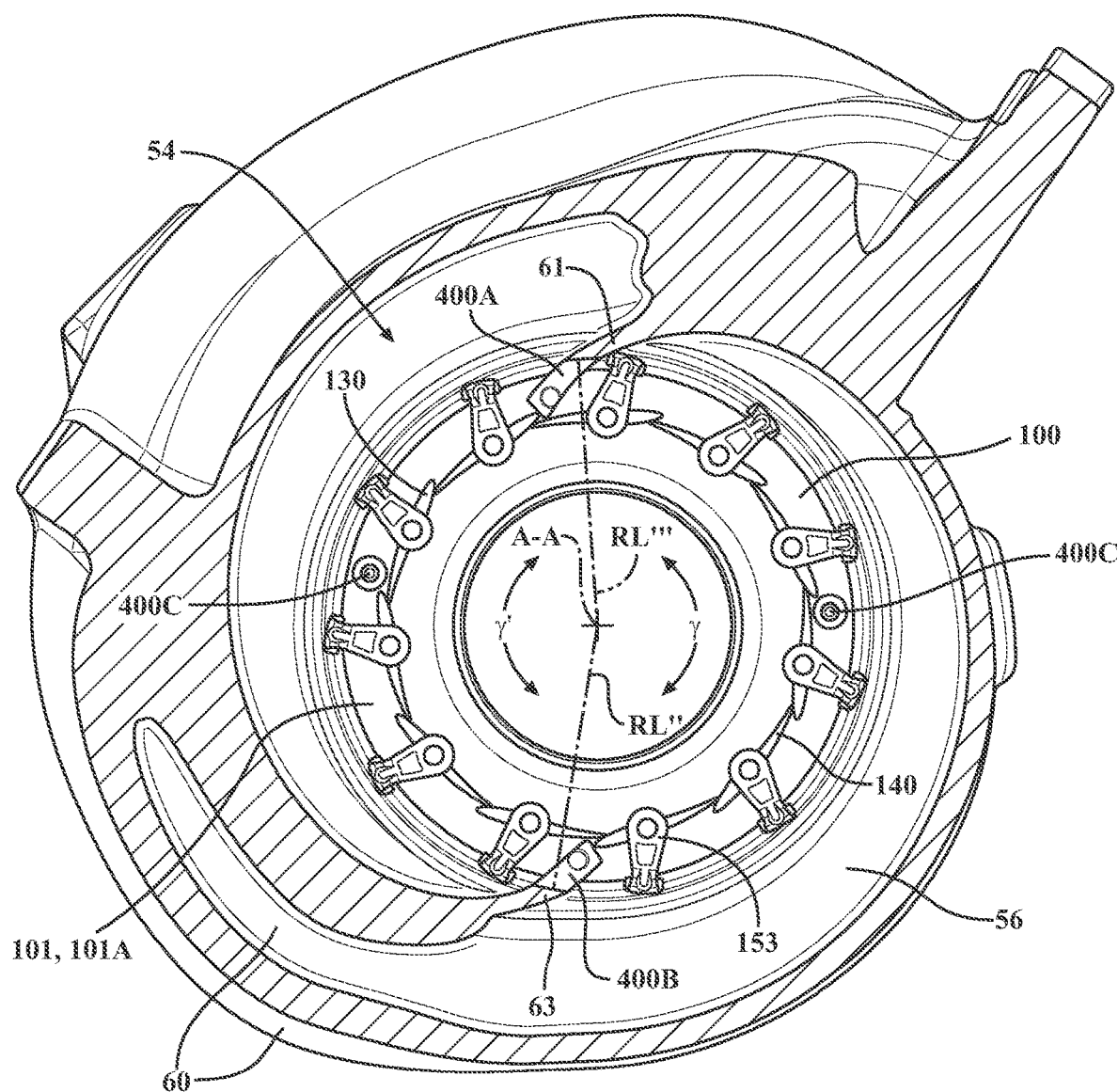
FIG. 11 is an end view of the vane ring and a portion of the dual volute turbine housing of FIG. 2 illustrating the tongue clocking angles (γ) and (γ') of the respective pair of tongues disposed outwardly of the vane ring.

The pattern of each respective vane of the first and second set of vanes 130, 140 rotatably disposed on the vane ring surface 102 of the annular disk 101 of the vane ring 100 (such as the pattern of each respective vane of the first and second set of vanes 130, 140 rotatably disposed of the inner vane ring surface 102A of each of the spaced apart annular disks 101A, 101B) can be individually defined in terms of the vane pivot point (VPP), a vane angle ($\alpha$), and a vane pitch circle radius ($\phi/2$) as illustrated in FIGS. 7-9. Further, the pattern of each respective vane of the first and second set of vanes 130, 140 can be defined based on a relationship amongst successively spaced vanes 130, 140 in terms of a vane spacing ($\beta$) as illustrated in FIG. 10. Even still further, the relationship between the first and second tongues 61, 63 relative to the vane ring 100 can also define a tongue clocking angle ($\gamma$) as illustrated in FIG. 11.

Referring now to FIG. 7, the vane pivot point (VPP) of the individual vanes 130, 140 are illustrated, which represents the point along the vane 130, 140 around which the 130, 140 rotates in a rotational direction about a pivot axis normal to the vane ring surface 102 between the open position, the closed position, and each of the intermediate positions. The vane pivot point (VPP) of the individual vanes 130, 140 are also defined as a distance "x" from the leading edge 132, 142 and along the mean line ML. The mean line ML (e.g., a mean chord line) is defined by a locus of points positioned between a leading edge 132, 142 and a trailing edge 134, 144 of the individual vane 130, 140 that extend through vane pivot point (VPP), which is typically respectively positioned halfway between the a first side and an opposing second side of individual vane 130, 140. The leading edges 132, 142 are used by convention herein, however the vane pivot point (VPP) of an individual vane 130, 140 could alternatively be defined as a distance "y" (not shown) from the trailing edge 134, 144 and along the mean line ML and arrive at the same vane pivot point (VPP). The distance "x" defining the VPP is located at a distance from the leading edge 132, 142 to the trailing edge 134, 144 along a length of the mean chord line ML, such as from about 20 to 45 percent of the total length of the mean chord line ML. Notably, however, while the location of the VPP may be the same or different for each individual vane 130, 140, the VPP's for each of the vanes 130 and 140 on any given vane ring 100 are positioned in the same relative location so that the vane angle ($\alpha$), vane pitch circle radius ($\phi/2$), and vane spacing ($\beta$) as described below can be determined. In the embodiments provided herein, the vane pivot point (VPP) of the respective vanes 130, 140 corresponds to a line extending along the length of shaft 133, 137, 143, 147 of the respective vane 130, 140 and within the respective opening 107 of the respective vane ring 100, 100A, 100n.

As shown in FIG. 8, the vane angle ($\alpha$) is illustrated and is defined as the angle made by a radial line RL extending from the axis of rotation A-A of the turbine wheel 42 through the vane pivot point (VPP) and the tangent line TL to the bottom of the respective vane 110, 120, 130, 140 (shown on representative vane 130 or 140 in FIG. 8). As an alternative, the tangent line TL could be defined by a straight chord line passing through a leading edge and trailing edge of the vane. The angle of the tangent line TL relative to the radial line RL is a function of relative radial distances of the leading edge 132, 142 (defined as a first radial distance) and the trailing edge 134, 144 (defined as a second radial distance) of a respective vane 130, 140. Typically, the first radial distance is equal to or greater than the second radial distance, with the vane angle ($\alpha$) ranging from 90 degrees (a maximum theoretical vane angle ($\alpha$) when the first radial distance is equal to the second radial distance) to 0 degrees (a minimum theoretical vane angle ($\alpha$) when the first radial distance is maximized and the second radial distance is minimized such that the tangent line TL is coextensive with the radial line RL). As the vane angle ($\alpha$) decreases from a theoretical maximum vane angle ($\alpha$) of 90 degrees towards from a theoretical minimum vane angle ($\alpha$) of 0 degrees, the flow of exhaust gas from the volute 54, 56 to the turbine wheel 42 disrupted by the respective vane 130, 140 is correspondingly decreased.

The vane angles (a) also are used to describe the closed position, the open position, and each of the intermediate positions of the respective vanes 130, 140 (See FIGS. 12-15). In particular, in the closed position (see for example FIGS. 12A, 13A, 14A, and 15A), the leading edge 132, 142 of each respective one vane of the plurality of vanes 130, 140, is positioned adjacent to the trailing edge 134, 144 of an adjacent one vane of the plurality of vanes 130, 140, and thus the vane angle ($\alpha$) is from 85 to 95 degrees, such as from 88 to 90 degrees, such as about 90 degrees, such as 90 degrees, which also is referred to herein as a 0% vane opening. The term "adjacent to", as used in this context, refers to a position where the leading edge 132, 142 of the respective one vane of the plurality of vanes 130, 140, is in contact with the trailing edge 134, 144 of the adjacent one vane of the plurality of vanes 130, 140. The term "adjacent to" can also refer to wherein there is a very small gap between the leading edge 132, 142 of the respective one vane of the plurality of vanes 130, 140, or wherein the leading edge 132, 142 is in contact with the trailing edge 134, 144 of the adjacent one vane of the plurality of vanes 130, 140. A "small gap", as defined herein, accounts for the range of vane angles ($\alpha$) from 85 to 95 degrees as defined above. Conversely, in the open position, which is typically used when the engine is operating at low engine speeds, the leading edge 132, 142 of each respective one vane of the plurality of vanes 130, 140, is spaced at a maximum distance from the trailing edge 134, 144 of an adjacent one vane of the plurality of vanes 130, 140 (see for example FIGS. 12C, 13C, 14C, and 15C) the vane angle ($\alpha$) is between 30 and 65 degrees, such as from 35 to 55 degrees, such as from 40 to 45 degrees, such as about 45 degrees, such as 45 degrees. The intermediate positions refer to any position between the closed position and the open position, such as in one representative position (a 60% open intermediate position as shown in FIGS. 12B, 13B, 14B, and 15B), and thus the vane angle ($\alpha$) is between the vane angle ($\alpha$) defining the closed position (i.e., 90 degrees) and the vane angle ($\alpha$) defining the open position. In certain embodiments, the 60% open intermediate position refers to a vane angle ($\alpha$) that is between 55 and 70 degrees, such as from 60 to 65 degrees, such as about 64 degrees, such as 64 degrees.

As shown in FIG. 9, the vane pitch circle radius ($\phi/2$) is illustrated and is defined as the length of the radial line RL extending from the axis of rotation A-A of the turbine wheel 42 to the vane pivot point (VPP) of a particular respective vane 130, 140 (shown as representative vane 130 or 140 in FIG. 9).

As shown in FIG. 10, the vane spacing ($\beta$) (i.e., angular vane spacing ($\beta$)) is illustrated and is defined as the angle ($\beta$) between the respective radial lines RL, RL' of two successive vanes 130, 140 (i.e., adjacent vanes 130, 140, shown on representative vane 130 or 140 in FIG. 10) spaced around the vane ring 100. In embodiments having equally spaced vanes (i.e., wherein the vane spacing ($\beta$) between each successive vane two successive vanes 130, 140 is constant), the vane spacing ($\beta$) in the vane ring 100 is found according to the calculation: 360 degrees/number of vanes. In vane ring 100 having eleven vanes 130, 140, such as provided in FIGS. 2-6 and 12-15, the angular vane spacing is about 32.7 degrees between each respective vane (360 degrees/11 vanes). In embodiments having unequally spaced vanes, the mean angular spacing (i.e., the mean average vane spacing between all the vanes around the vane ring 100) can be calculated by the same equation.

As shown in FIG. 11, the tongue clocking angle ($\gamma$) is defined as the angle between the two respective radial lines RL", RL'" extending from the axis of rotation A-A of the turbine wheel 42 to a respective one of the two tongues 61, 63 at a position adjacent to the outer circumferential ring 106 of the annular disk 101. A second tongue clocking angle ($\gamma'$) can also be defined, which is calculated by subtracting the tongue clocking angle ($\gamma$) (i.e., the first tongue clocking angle ($\gamma$)) from 360 degrees.

Referring next to FIGS. 12-15, four embodiments of entryway systems that include divided volute turbochargers are provided (one (FIG. 12) in accordance with the prior art and three (FIGS. 13-15) illustrating embodiments of the present invention) that illustrate various vane patterns in terms of vane spacing ($\beta$), vane pitch circle radii ($\phi/2$), vane angles (a), clocking ((γ) and (γ')) of the tongues 61, 63, in combination with various spacer 400 arrangements, in each of a closed position, one intermediate position, and an open position.

Figure 12A:
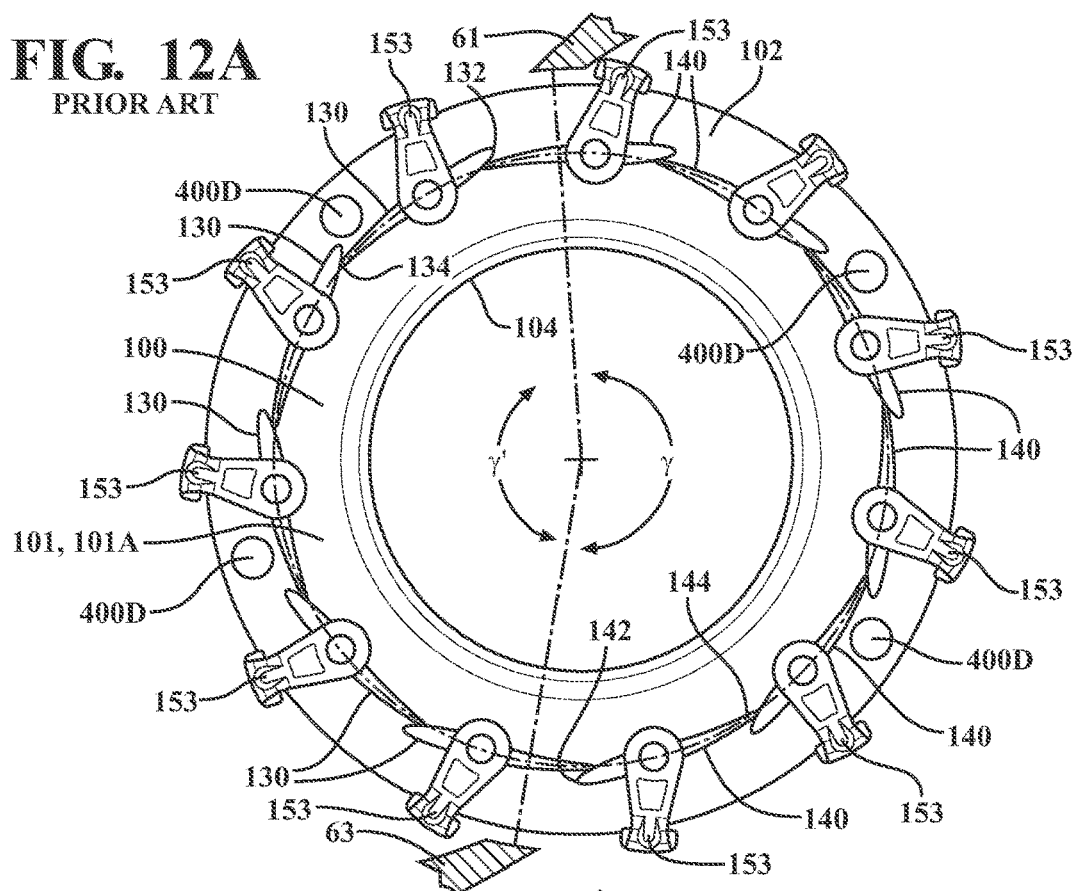
FIG. 12A is an end view of the vane ring, spacers, and a portion of the divided volutes of FIG. 2 in accordance with the prior art with the plurality of vanes in a closed position with equal vane spacing (β), equal vane pitch circle radii (φ/2), and unequal tongue clocking angles (γ) and (γ') of the respective pair of tongues with volute separation, and with the spacers not aligned with the first and second tongue of the walls of the divided volute.
Figure 12B:
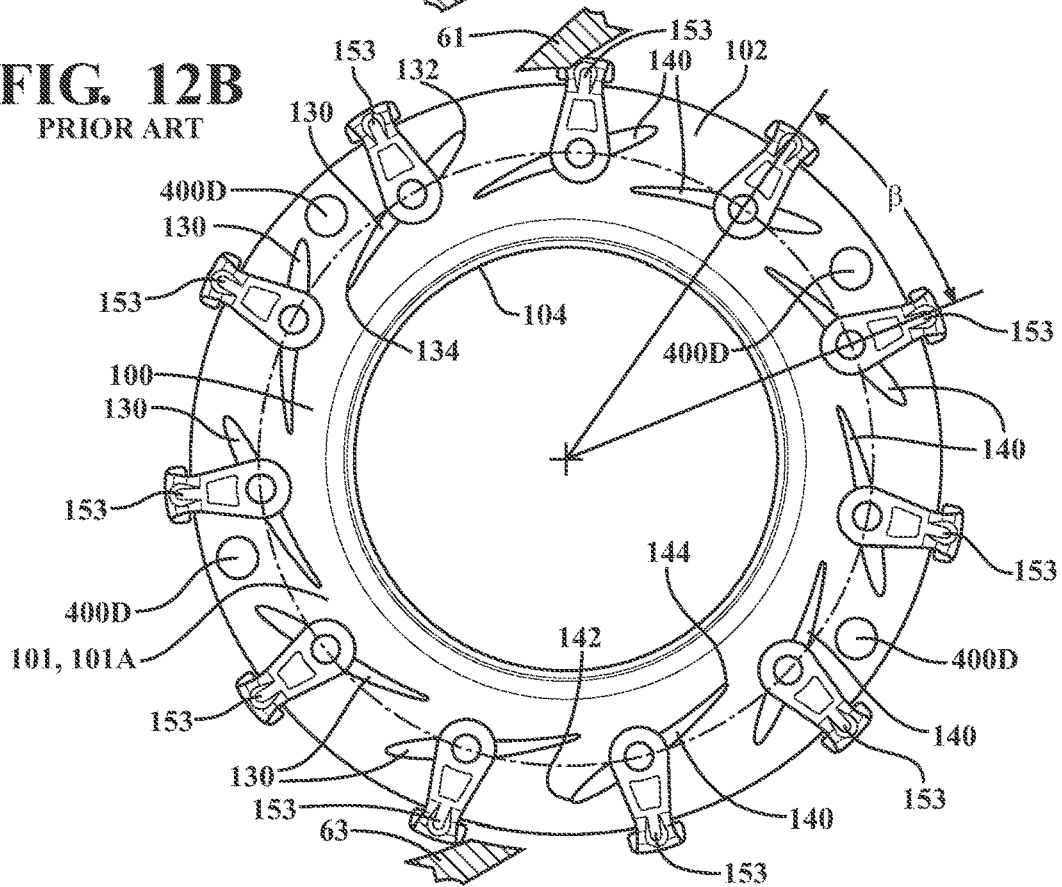
FIG. 12B is another end view of FIG. 12A with the plurality of vanes rotated to a 60% open intermediate position.
Figure 12C:
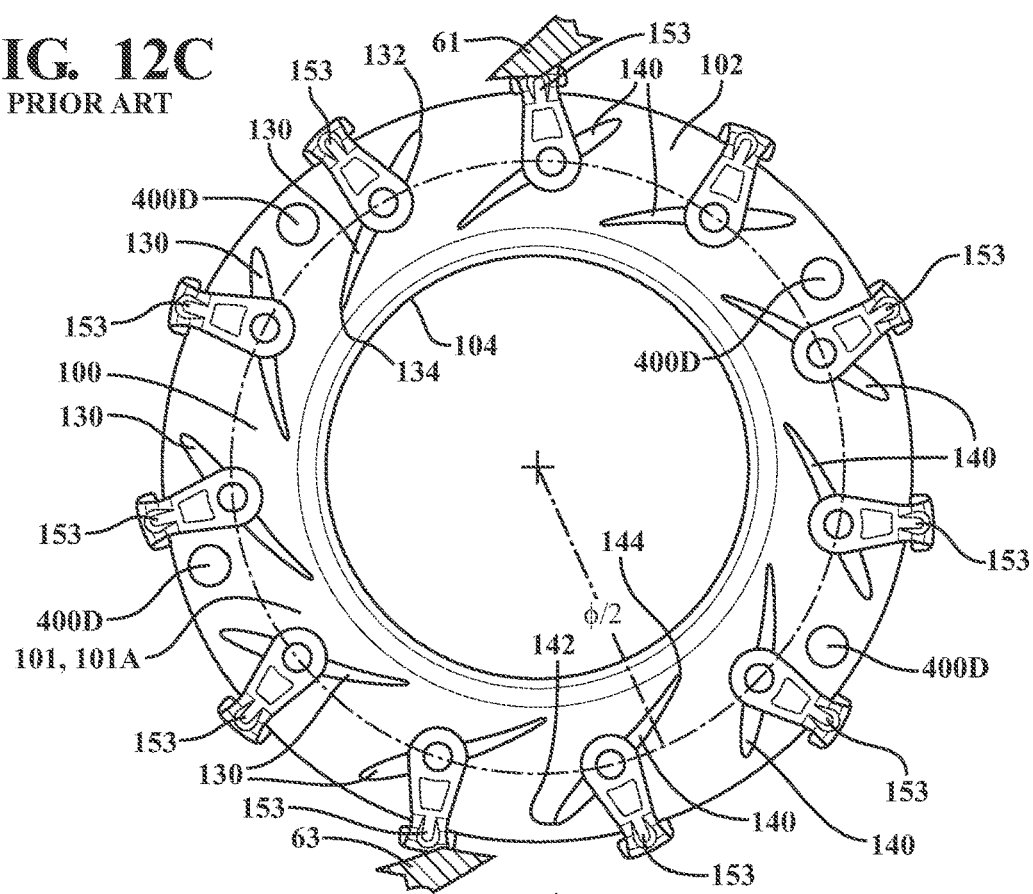
FIG. 12C is another end view of FIG. 12A with the plurality of vanes rotated to a 100% open position.

In FIGS. 12A-C, the various components described immediately below (such as the vane ring 100) are the same as the corresponding components described in FIGS. 2-11 and 13-16, and thus will utilize the same reference numbers for ease of description, with the differences between the particular configurations of the components described in the paragraphs below.

In particular, FIGS. 12A-12C illustrate an embodiment of an annular disk 101 of the vane ring 100 with rotatable vanes 130, 140 rotatably disposed thereon for use an entryway system similar to that of FIG. 2 above in accordance with the prior art in which the first and second volutes 54, 56 are configured with first and second volute 54, 56 separation, with each volute 54, 56 having an identical respective (minimum) cross-sectional area (CA, CA', respectively, see FIG. 2) defined as the volute throat, just upstream of the interface with the vane ring 100, alternatively referred to as identical critical throat areas at the interface with the vane ring 100 (the volutes 54, 56 and the corresponding critical throat areas at the interface with the vane ring 100 are shown in the corresponding FIG. 2). The identical critical throat area also includes wherein a first tongue clocking angle (γ') between the first and second tongues 61, 63 corresponding to the first arcuate region 105 is less than 180 degrees (see FIG. 12A), while a second tongue clocking angle (γ) between the between the first and second tongues 61, 63 corresponding to the second arcuate region 115 is greater than 180 degrees, with the total combined degrees of the first and second clocking angles (γ'+γ) equals 360 degrees.

To achieve the identical critical flow parameter, the runner length of the second volute 56 (defined along the spiral length of the second volute 56 from its outer end 56a (see FIGS. 2 and 3) and its inner end 56b (see FIG. 2)) may differ from the corresponding runner length of the first volute 54 (defined along the spiral length of the first volute 54 from its outer end 54a (see FIGS. 2 and 3) and its inner end 54b (see FIG. 2)).

As also illustrated in FIGS. 12A-C, the of each of the respective vanes 130, 140 is the same, with each of the respective vane pivot points (VPP) of the respective vanes 130, 140 being located between the inner circumferential vane pitch circle radii (φ/2) edge 104 and the outer circumferential edge 106, such as approximately midway between the inner circumferential edge 104 and the outer circumferential edge 106 (see in particular FIG. 12C). Still further, the vane spacing (β) of each of the respective eleven vanes 130, 140, as shown in FIG. 12C, corresponds to an equiangular vane spacing angle (β) of about 32.7 degrees. The equiangular vane spacing angle (β) also corresponds to the mean average vane spacing of the respective eleven vanes 130, 140, with mean average vane spacing simply being calculated as 360 degrees divided by the total number of vanes 130, 140. As provided herein, the combination of the plurality of vanes 130, 140 disposed on the vane ring surface 102 with equal vane pitch circle radii (φ/2) and with equiangular vane spacing angle (β) defines a symmetric vane pattern (see for example FIG. 12). Conversely, the combination of the plurality of vanes 130, 140 disposed on the vane ring surface 102 with an unequal vane pitch circle radii ((φ/2) and (φ/2') (see for example FIG. 14) or with an unequal vane spacing angles (β) and (β') (see for example FIG. 13), or with both an unequal vane pitch circle radii ((φ/2) and (φ/2')) and unequal vane spacing angles ((β) and (β') (see for example FIG. 15) defines an asymmetric vane pattern. Accordingly, the prior art embodiment of FIG. 12 has a symmetric vane pattern, as defined herein, by virtue of having equal vane pitch circle radii (φ/2) and equiangular vane spacing angle (β).

As also illustrated in each of FIGS. 12A-12C, a plurality of equally spaced spacers 400D (shown in FIGS. 12A-12C as four spacers 400D) are also included which are disposed circumferentially outward of the plurality of vanes 130, 140. However, as opposed to the embodiments described above with respect to FIG. 2 and as will be described below with respect to FIGS. 13-15, none of the spacers 400D are positioned adjacent to a respective one of the tongues 61, 63, and hence none of the spacers 400D are aerodynamic spacers such as the first one 400A or second one 400B of the aerodynamic spacers as defined herein. In FIGS. 12A-12C, the spacers 400D may be similar to the additional spacers 400C described above in FIG. 2. In particular, and similar to the spacers 400C, the spacers 400D are typically in the form of circular posts (as shown in FIGS. 12A-C) and are generally spaced circumferentially outward a sufficient distance from a respective adjacent one of the vanes 130, 140 to allow the vane 130, 140 to rotate between the closed (see FIG. 12A) and open position (see FIG. 12C) and through each of the intermediate positions (one representative intermediate position, corresponding to a 60% open position, is illustrated in FIG. 12B) without encumbrance. In addition, the one or more spacers 400D are typically also spaced from the outer circumferential ring 106 (such as shown in FIGS. 12A-C) but may extend in length to the outer circumferential ring 106. The number of spacers 400D is not limited to four spacers 400D as shown in FIGS. 12A-C but may vary from as little as two spacers 400D to as many spacers are the number of vanes 130 or more.

In the closed position as shown in FIG. 12A, the leading edge 132, 142 of each respective one vane of the plurality of vanes 130, 140, is positioned adjacent to the trailing edge 134, 144 of an adjacent one vane of the plurality of vanes 130, 140, and thus the vane angle (α) is from 85 to 95 degrees, such as from 88 to 90 degrees, such as about 90 degrees, such as 90 degrees, which also is referred to herein as a 0% vane opening. In this closed position, the leading edge 132 of two of the vanes 130 are also positioned adjacent to two of the spacers 400D, while the leading edge 142 of two of the vanes 140 are also positioned adjacent to the other two of the spacers 400D.

Conversely, in the open position as shown in FIG. 12C, the leading edge 132, 142 of each respective one vane of the plurality of vanes 130, 140, is spaced at a maximum distance from the trailing edge 134, 144 of an adjacent one vane of the plurality of vanes 130, 140 with the vane angle (α) between 30 and 65 degrees, such as from 35 to 55 degrees, such as from 40 to 45 degrees, such as about 45 degrees, such as 45 degrees. The intermediate positions refer to any position between the closed position and the open position. In the one representative position (a 60% open position as shown in FIG. 12B), the vane angle (α) is between the vane angle (α) defining the closed position and the vane angle (α) defining the open position, as described above. In FIG. 12B, the 60% open position refers to a vane angle (α) that is between 55 and 70 degrees, such as from 60 to 65 degrees, such as about 64 degrees, such as 64 degrees. In these intermediate and open positions position, the leading edge 132 of two of the vanes 130 are also positioned adjacent to two of the spacers 400D, while the leading edge 142 of two of the vanes 140 are also positioned adjacent to the other two of the spacers 400D, but the gap is increasing between the respective leading edges 132 or 142 and the respective spacer 400D as the vanes are moved toward the open position, thereby adjusting the flow of exhaust gas through the vane ring 100 during a respective pulse from either the first or second set of cylinders 70, 72 in accordance with the increased size of the gap.

In this configuration, assuming generally equal pulses of exhaust gas being produced corresponding to an exhaust stroke of each of the first and second groups of cylinders 70, 72 (i.e., as defined herein, the term "generally equal" refers to an exhaust gas emission from each of the first and second groups of cylinders, with generally equal being defined as having an exhaust gas emission of the first set of cylinders 70 being within twenty percent, such as within thirteen or seven or five or two percent, of the exhaust gas emission of the second set of cylinders 72 corresponding to each respective exhaust stroke), the first volute flow parameter 55 is different (such as larger or smaller) from the corresponding second volute flow parameter 57 by virtue of e.g. the difference in runner length and turning radius of the first volute 54 compared to the of the second volute 56, even though the critical throat areas are the same. Moreover, the corresponding first vane flow parameter 135 has a value lower than the corresponding second vane flow parameter 145 by virtue of the inclusion of one additional vane 140 in the second arcuate region 115 (i.e., FIG. 12 illustrates a vane ring 100 having six vanes 140 in the second arcuate region 115 and only five vanes 130 in the first arcuate region 105). These statements are true regardless of whether the plurality of vanes 130, 140 are in the closed position as shown in FIG. 12A, the open position as shown in FIG. 12C, or any one of the intermediate positions, including the one intermediate position as shown in FIG. 12B.

Accordingly, the first total flow parameter 165 is generally equal to the second total flow parameter 175 (i.e., there is generally equal exhaust flow from the first volute 54 through the vane ring 100 to the turbine blades 45 during a pulse of exhaust gas from the first group of cylinders 70 as from the second volute 56 through the vane ring 100 to the turbine blades 45 during a pulse of exhaust gas from the second group of cylinders 72), regardless of whether the plurality of vanes 130, 140 are in the closed position as shown in FIG. 12A, the open position as shown in FIG. 12C, or any one of the intermediate positions, including the one intermediate position as shown in FIG. 12B. As defined herein, the term "generally equal" as it relates to flow parameter values refers to a first total flow parameter value that is within twenty percent, such as within thirteen or seven or five or two percent, of another total flow parameter value, and as defined in a dual volute turbocharger 32 as used herein wherein the values of the total first flow parameter 165 are within ten percent of the total second flow parameter 175, such as within ten percent, such as within seven percent, such as within five percent, such as within two percent. The "generally equal flow rates" of the first and second total flow parameters 165, 175 may also alternatively be referred to herein as "equalized flow" or an equivalent term. While the total flow parameters 165, 175 are generally equal as described above, the first total flow parameter 165 in the embodiment of FIG. 12 is slightly different, such as slightly higher (i.e. has a value slightly larger) than the corresponding second total flow parameter 175, but with the allowable deviations of flow values described above (i.e., within twenty, or thirteen, or seven or five or two percent as defined above). To achieve the generally equal flow rates or equalized flow, when the first volute flow parameter 55 is different, such as larger, than the second volute flow parameter 57, such as shown in FIG. 2, the second vane flow parameter 175 is larger than the first vane flow parameter 165.

However, in the embodiment of FIG. 12A-C, while the equal vane spacing (β) and equal vane angles (a) of the respective vanes 110, 120, 130 and 140, alone or in combination with the equal vane pitch circle radii (ϕ/2), achieves the generally equalized flow as described above, the high degree of periodic cyclic pressure fluctuations that excite the turbine wheel 42 may increase the risk of high cycle fatigue (HCF) even where there is generally equalized flow. Further, while the relative positioning of the spacers 400D in the embodiment of FIG. 12A-C contributes to the generally equalized flow and minimize flow disturbance of exhaust gas flowing from the one or more volutes 54, 56 to the turbine wheel 42, as described above, the lack of a spacer 400 positioned adjacent to the first tongue 61 and to the second tongue 63 allows scroll leakage to between the vanes 130, 140 and the respective first and second tongue 61, 63 that occurs as the vanes 130, 140 are moved.

FIGS. 13-15 illustrate three embodiments of a configuration of vanes 130, 140 disposed on an annular disk 101, and spacers 400 for use in the entryway system 30, in which a different spacer configuration is utilized as compared to FIG. 12, and in which the same number of vanes 130 and 140 are rotatably disposed on the annular disk 101 in different asymmetric vane patterns as compared to FIG. 12 (with the asymmetric vane pattern, as defined herein, achieved by virtue of these entryway systems 30 having one or both of unequal vane pitch circle radii ((ϕ/2) and (ϕ/2')) and unequal angular vane spacing ((β) and (β')). so as to still provide generally equal flow symmetry (but in the embodiments of FIGS. 13-15 wherein the values of the total first flow parameter 165 are within ten percent of the total second flow parameter 175) as described above, but with reduced risk of HCF as compared with the embodiment of FIG. 12. Accordingly, in each of the exemplary embodiments of FIGS. 13-15, to achieve the generally equal flow rates or equalized flow when the first volute flow parameter 55 is different, such as larger, than the second volute flow parameter 57, the second vane flow parameter 175 is configured with the asymmetric vane pattern so that it has a correspondingly different, such as larger, value than the first vane flow parameter 165. Still further, by providing an alternative spacer configuration, a reduced scroll leakage between the spacers 400 and the tongues 61, 63 can be achieved that not only contributes to minimizing flow disturbance but also is beneficial for optimal pulse energy capture at low engine speed, while at higher engine speeds increased leakage between scrolls occurring when the vanes are moved to the open position is beneficial for reduced back pressure.

In particular, FIGS. 13A-13C, 14A-14C, and 15A-15C illustrates three exemplary embodiments in which the first and second volutes 54, 56 are configured with the same volute 54, 56 configuration and tongue clocking angle (γ') as described above with respect to FIGS. 12A-C.

However, in each of the embodiments of FIGS. 13-15, and corresponding to the embodiment of FIG. 2, the entryway system 30 also includes a plurality of spacers 400, disposed in a spaced apart manner on the vane ring surface 102 of the vane ring 100 (or along the inner vane ring surface 102A of each of the spaced apart vane rings 100A, 100B) and positioned circumferentially outward from each vane of the first and second set of vanes 130, 140.

In the embodiment of FIGS. 13-15, the first one 400A of the plurality of spacers 400 is positioned adjacent to the first tongue 61 of the wall 60, while a second one 400B of the plurality of spacers is positioned adjacent to the second tongue 63 of the wall 60, with the term "adjacent to" as described above. In addition, the respective first one 400A and second one 400B are also positioned adjacent to the outer circumferential ring 106 such that the respective first one 400A or second one 400B of the spacers 400 is aligned, and in certain embodiments generally flush to the respective first or second tongue 61, 63. In addition, the respective circumferentially inward most portion of the respective first one 400A or second one 400B are spaced circumferentially outward a sufficient distance from a respective adjacent one of the vanes 130, 140 to allow the vane 130, 140 to rotate between the open and closed position without encumbrance. In these positions, and in addition to assisting in adjusting the flow of exhaust gas entering from the respective first or second volute 54, 56 prior to being received by the turbine blades 45, as noted above, the first one 400A and second one 400B of the spacers 400 function to reduce scroll to scroll leakage that occurs between the vanes 130, 140 and tongues 61, 63 during operation of the entryway system 30 in each of the intermediate positions and open position.

In addition to the first one 400A and second one 400A of the spacers 400, in the embodiments of FIGS. 13-15, the plurality of spacers 400 includes one or more additional spacers, here shown as a pair of additional spacers 400C, with one of the additional pair of spacers 400C positioned in the first arcuate region 105 and the other of the pair of additional spacers 400C positioned in the second arcuate region 115, with each of the pair of spacers 400C therefore being between the first one 400A and second one 400B of the spacers 400. The one or more additional spacers 400C in FIGS. 13-15 are in the form of circular posts and are generally spaced circumferentially outward a sufficient distance from a respective adjacent one of the vanes 130, 140 to allow the vane 130, 140 to rotate between the open and closed position without encumbrance. In addition, as illustrated in FIGS. 13-15, the pair of additional spacers 400C are also spaced from the outer circumferential ring 106. The additional spacers 400C therefore function in the same manner as the spacers 400D in FIGS. 12A-C in each of the open, closed, and intermediate positions.

Further, in the exemplary embodiments of FIGS. 13 and 15, at least one respective adjacent pair of the vanes 130, 140 has a different vane spacing (β') as compared with at least one additional respective adjacent pair of respective vanes 130, 140 having the original vane spacing (β) found in FIGS. 12 and 14 while maintaining the desired first and second vane flow parameters 135, 145 to achieve generally equal flow to the turbine wheel 42 as described above.

In particular, as illustrated and labelled in FIGS. 13 and 15, one adjacent pair of the second set of vanes 140 of the second arcuate region 115 is illustrated as having the original vane spacing (β) as compared with an adjacent pair of the first set of vanes 130 having an increased vane spacing (β') in the first arcuate region 105 as provided in FIGS. 12 and 14. To accommodate this increased vane spacing (β') of one adjacent pair of the first set of vanes 130, while maintaining the total number of vanes 130, 140 of the vane ring 100 at the same number, it necessarily follows that at least one other adjacent pair of the first set of vanes 130 along the same arcuate region 115 must have a decreased vane spacing so as to maintain the desired first vane flow parameter 135, and hence maintain the first total flow parameter 165, to maintain generally equal flow to the turbine wheel 42 as described above in the embodiments of FIGS. 13 and 15. Still further, alternative embodiments of FIGS. 13 and 15 are contemplated wherein at least one additional pair of vanes 130, 140 has a different vane spacing from vane spacings (β) and (β') as illustrated, with the different vane spacing having one an increased angular vane spacing or a decreased angular vane spacing. This third and different vane spacing may be between one of the first set of vanes 130 and one of the second set of vanes 140, or any two adjacent vanes from either the first set of vanes 130 or the second set of vanes 140.

The varied vane spacing (β, β') of the vanes 130, 140 along at least one of the first and second arcuate regions 105, 115 as illustrated in FIGS. 13 and 15, also in combination with the unequal clocking of the tongues 61, 63 as also provided in FIG. 15, is also expected to reduce the HCF forcing function while maintaining the generally equal flow symmetry as compared with the embodiment of FIG. 12.

In particular, the introduction of unequal and varied vane spacing (β, β') to create an asymmetric vane spacing pattern, as exemplified the exemplary embodiment of FIGS. 13 and 16, can reduce HCF forcing function reduction in systems having a vane pattern with equal vane spacing, such as in FIG. 12, and achieve (at a given vane 130, 140 position) between an 8 and 51% reduction in turbine wheel forced response (dynamic stress associated with various modes and orders) while maintaining a generally equal flow symmetry of less than seven percent (i.e., wherein the values of the first and second total flow parameters 165, 175 are within seven percent of one another) based on analytic assessment.

In the embodiments of FIGS. 13 and 15 having unequal vane spacing (β, β') or varied vane spacing (β, β'), the total number of adjacent pairs of the plurality of vanes 130, 140 having a vane spacing greater than a mean average vane spacing is no more than one-half a total number of adjacent pairs of said plurality of vanes 130, 140 having a vane spacing less than the mean average vane spacing, and wherein a standard deviation of said vane spacings from the mean average vane spacing is in a range of 0.1 to 6.

In certain embodiments, the vane pitch circle radius (φ/2) of the first set of vanes 130 differs from the vane pitch circle radius (φ/2) of the second set of vanes 140. In the exemplary embodiments of FIGS. 14 and 15, each of second set of vanes 140 are provided with an increased vane pitch circle radius (φ/2') as compared with the first set of vanes 130 having the original vane pitch circle radius (φ/2) as provided in the embodiment of FIG. 12. In these embodiments, the ratio of the respective vane pitch circle radius (i.e., φ/2: φ/2') in the embodiment of FIGS. 14 and 15 may vary from slightly greater than 1:1 to about 2:1, such as from 1.001 to 1.100, such as 1.025:1. Stated another way, the vane pitch circle radius (φ/2') of the second set of vanes 140 is between one and two times greater than the vane pitch circle radius (φ/2) of the first set of vanes 130. In alternative embodiments, however, each of second set of vanes 140 may be provided with a decreased vane pitch circle radius (φ/2) as compared with the first set of vanes 130 having the original vane pitch circle radius (φ/2). And thus, for example, the vane pitch circle radius (φ/2') of the first set of vanes 130 is between one and two times greater than the vane pitch circle radius (φ/2) of the second set of vanes 140.

The increased vane pitch circle radius (φ/2' vs. φ/2) of the second set of vanes 140, as illustrated in FIGS. 14 and 15, in combination with the unequal clocking of the tongues 61, 63 as also illustrated in FIGS. 14 and 15, are expected to maintain the generally equal flow symmetry of FIG. 14 within the 10 percent value while reducing HCF forcing function as compared with the embodiment of FIG. 12.

While FIGS. 14 and 15 illustrates a vane ring 100 with vanes 130, 140 having two different sets of vane pitch circle radii (φ/2' vs. φ/2), the present invention contemplates wherein one or more of the vanes 130, 140 may have three or more different vane pitch circle radii.

Figure 13A:
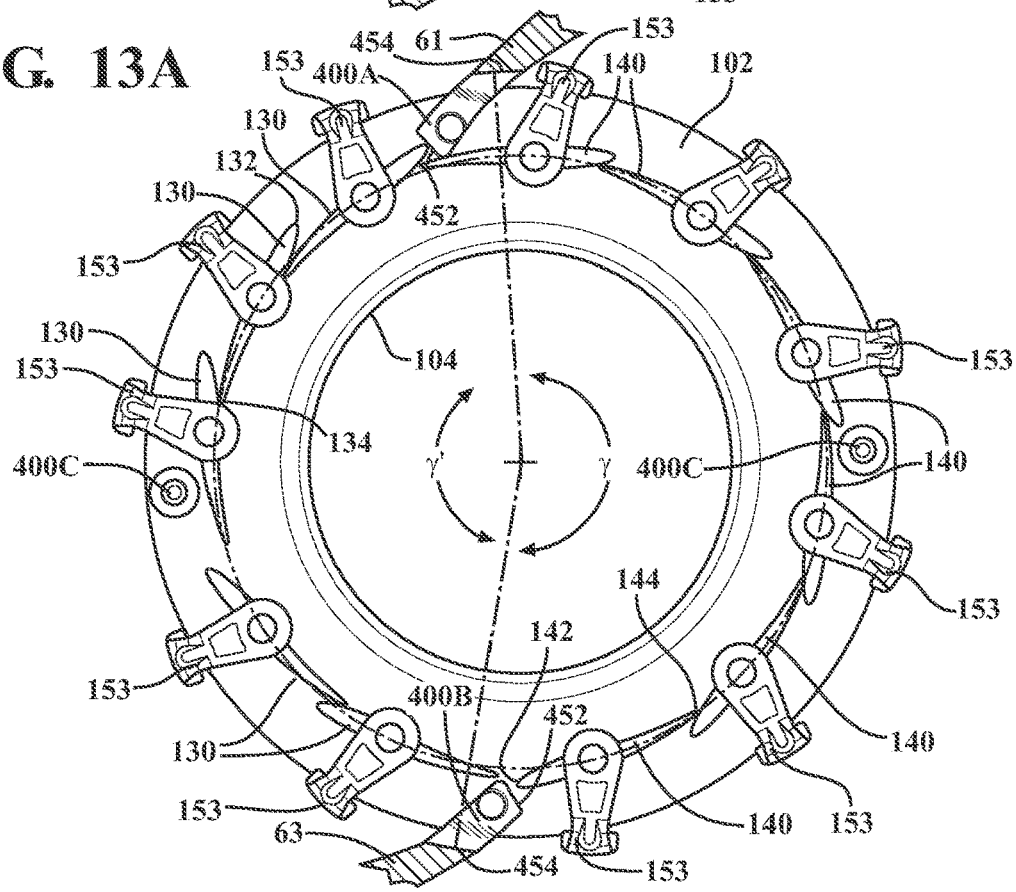
FIG. 13A is an end view of the vane ring, aerodynamic spacers, additional spacers, and a portion of the divided volutes of FIG. 2 for use in the turbocharger of the system of FIGS. 1-7 in accordance with an embodiment of the present invention, with the plurality of vanes illustrating an asymmetric vane pattern in a closed position and with the plurality having unequal vane spacing (β) and (β'), equal vane pitch circle radii (φ/2), and unequal tongue clocking angles (γ1) and (γ2) of the respective pair of tongues with volute separation at the tongue vanes, and with a pair of the aerodynamic spacers aligned with a corresponding one of the first and second tongues of the walls of the divided volute.
Figure 13B:
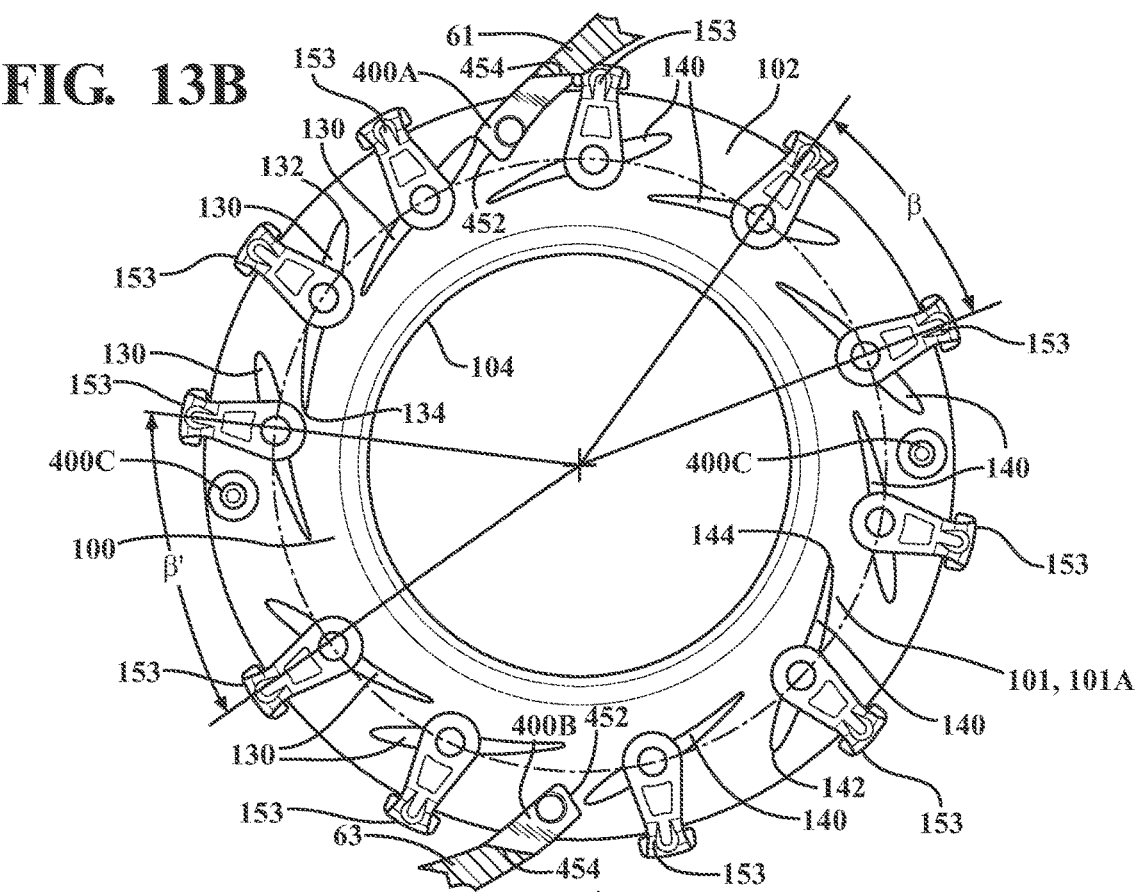
FIG. 13B is another end view of FIG. 13A with the plurality of vanes rotated to a 60% open intermediate position.
Figure 13C:
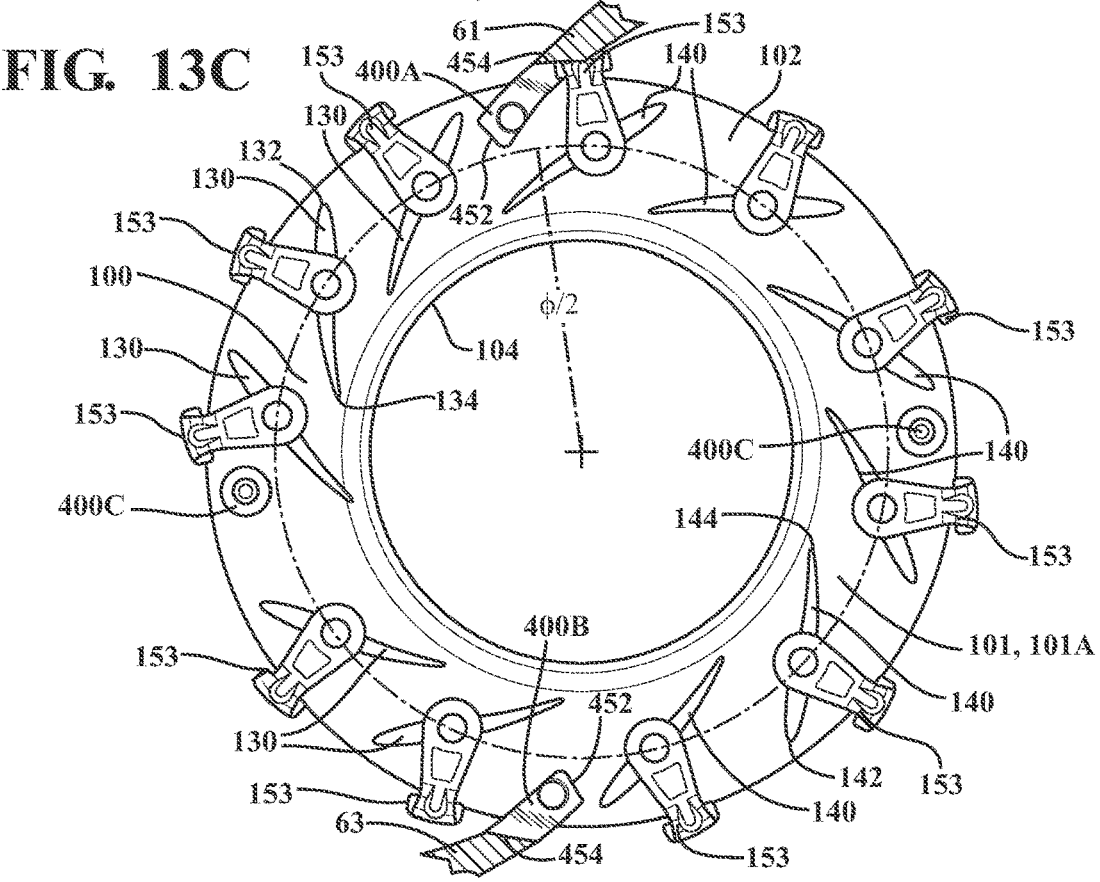
FIG. 13C is another end view of FIG. 13A with the plurality of vanes rotated to an open position.
Figure 14A:
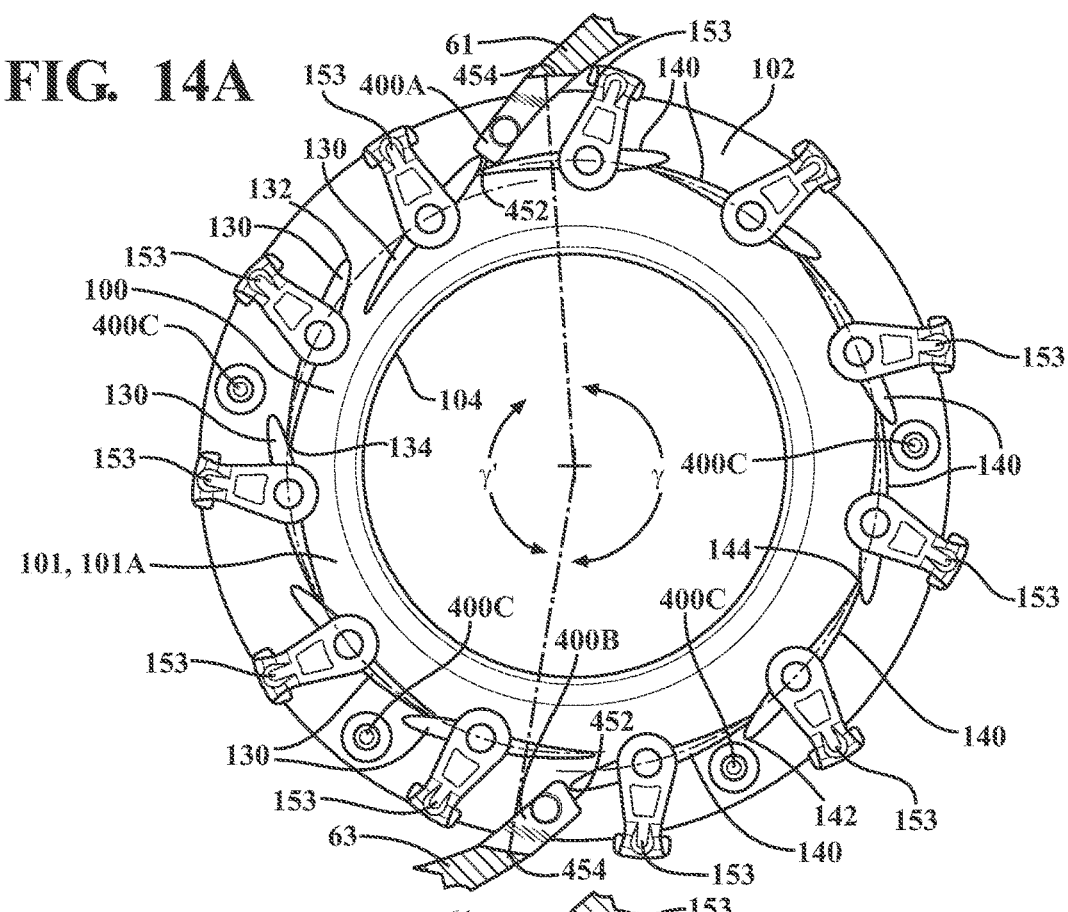
FIG. 14A is an end view of the vane ring, aerodynamic spacers, additional spacers and a portion of the divided volutes of FIG. 2 for use in the turbocharger of the system of FIGS. 1-6 in accordance with an embodiment of the present invention, with the plurality of vanes illustrating an asymmetric vane pattern in a closed position and with the plurality having equal vane spacing (β), unequal vane pitch circle radii (φ/2) and (φ/2'), and unequal tongue clocking angles (γ) and (γ') of the respective pair of tongue vanes with volute separation at the tongue vanes, and with a pair of the aerodynamic spacers aligned with a corresponding one of the first and second tongues of the walls of the divided volute.
Figure 14B:
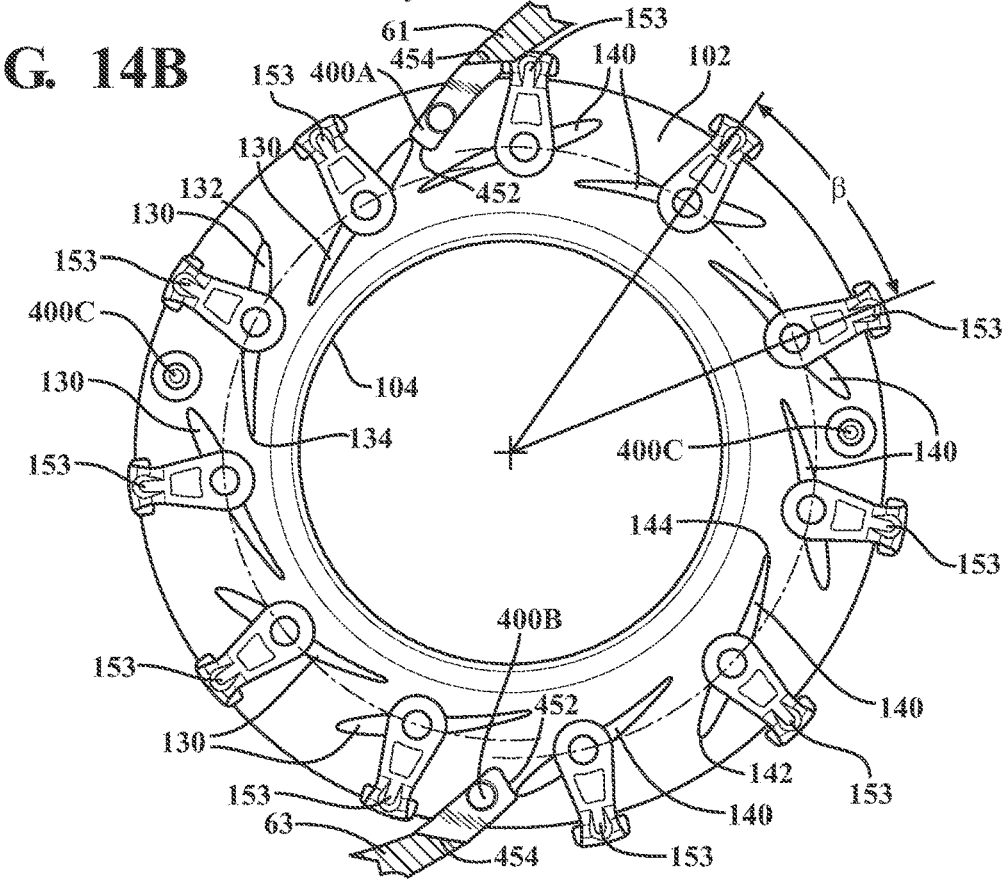
FIG. 14B is another end view of FIG. 14A with the plurality of vanes rotated to a 60% open intermediate position.
Figure 14C:
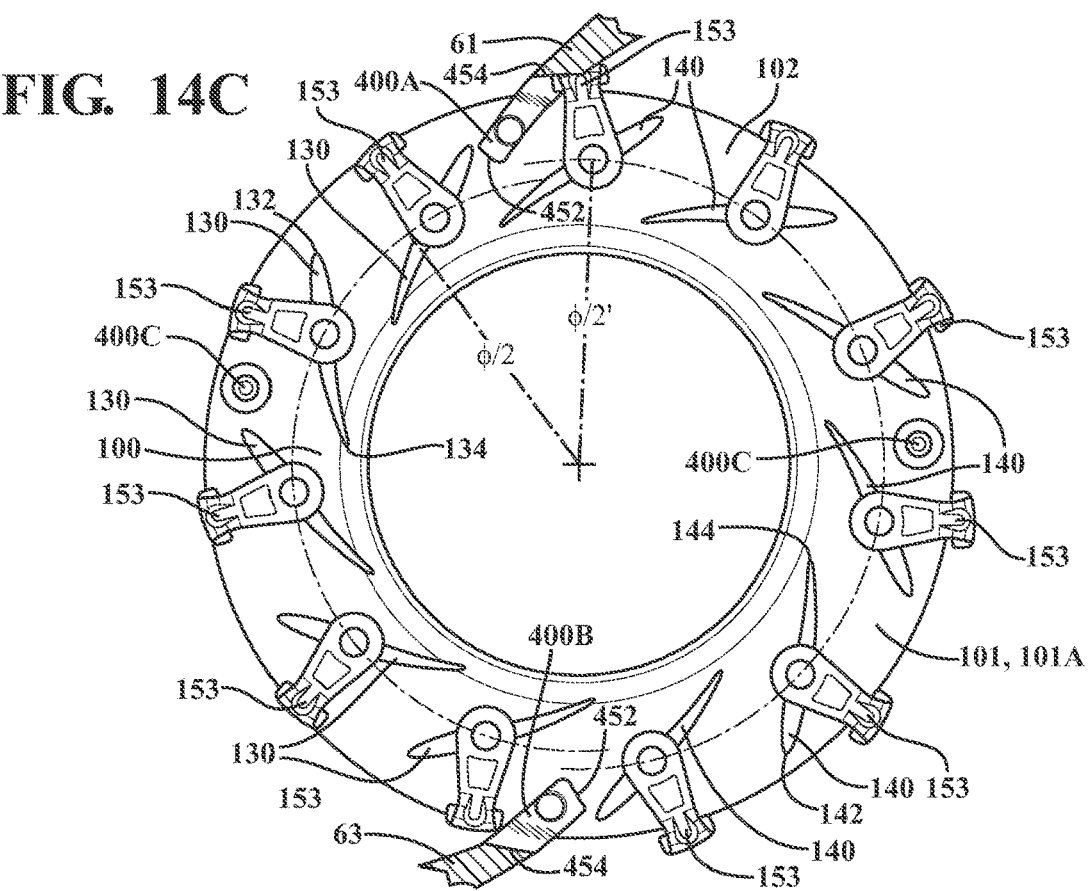
FIG. 14C is another end view of FIG. 14A with the plurality of vanes rotated to an open position.
Figure 15A:
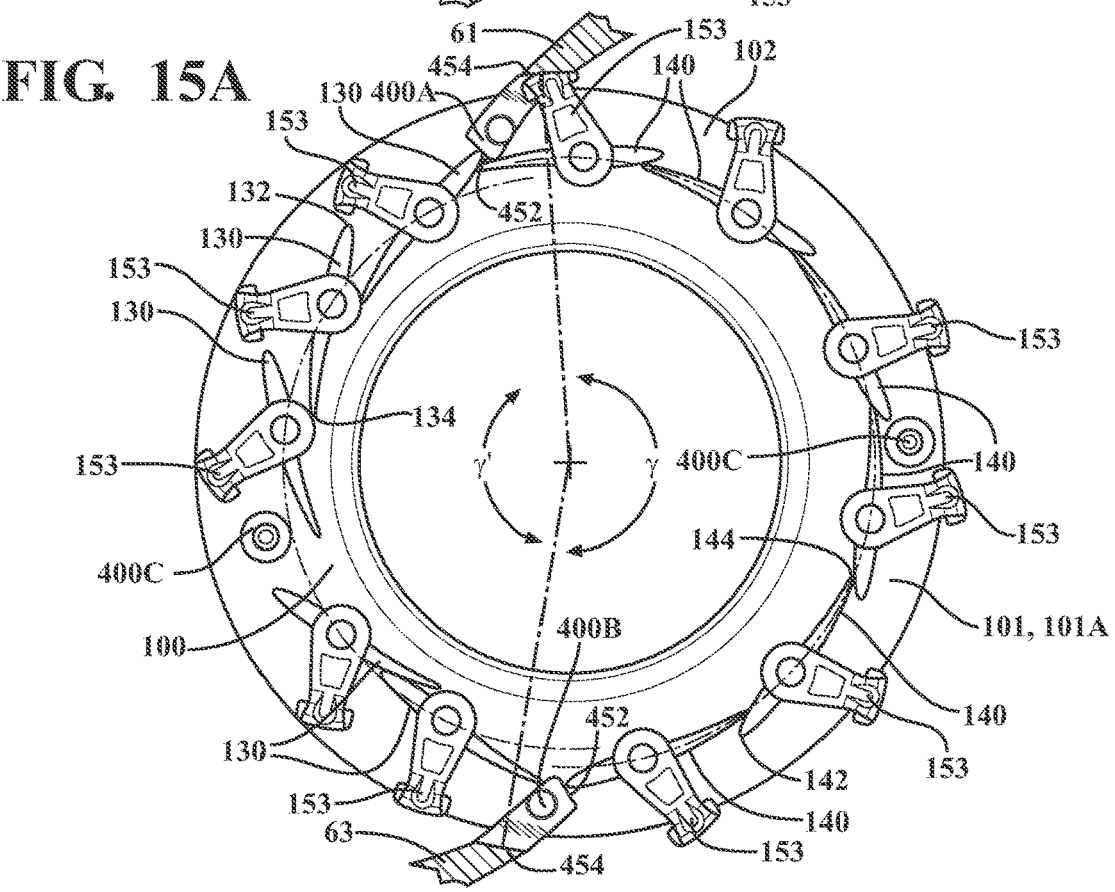
FIG. 15A is an end view of the vane ring, aerodynamic spacers, additional spacers and a portion of the divided volutes of FIG. 2 for use in the turbocharger of the system of FIGS. 1-6 in accordance with an embodiment of the present invention, with the plurality of vanes illustrating an asymmetric vane pattern in a closed position and with the plurality having unequal vane spacing (β) and (β'), unequal vane pitch circle radii (φ/2) and (φ/2'), and unequal tongue clocking angles (γ) and (γ') of the respective pair of tongue vanes with volute separation at the tongue vanes, and with a pair of the aerodynamic spacers aligned with a corresponding one of the first and second tongue of the walls of the divided volute.

Similar to the systems shown in FIGS. 2 and 12, the vanes 130, 140 of these three exemplary embodiments may be rotated between the closed (see FIGS. 13A, 14A, 15A) and open position (see FIGS. 13C, 14C, 15C) and through one or more intermediate positions (one representative intermediate position, corresponding to a 60% open position, is illustrated in FIGS. 13B, 14B, 15B).

In the closed position as shown in FIGS. 13A, 14A, 15A, the leading edge 132, 142 of each respective one vane of the plurality of vanes 130, 140, is positioned adjacent to the trailing edge 134, 144 of an adjacent one vane of the plurality of vanes 130, 140, and thus the vane angle (α) is from 85 to 95 degrees, such as from 88 to 90 degrees, such as about 90 degrees, such as 90 degrees, which also is referred to herein as a 0% vane opening. In this closed position, the leading edge 132 of one of the vanes 130 is also positioned adjacent one of the additional spacers 400C, while the leading edge 142 of one of the vanes 140 is also positioned adjacent to the other one of the additional spacers 400C.

Conversely, in the open position as shown in FIGS. 13C, 14C, 15C, the leading edge 132, 142 of each respective one vane of the plurality of vanes 130, 140, is spaced from, such as at a maximum distance spaced from, the trailing edge 134, 144 of an adjacent one vane of the plurality of vanes 130, 140 with the vane angle (α) between 30 and 65 degrees, such as from 35 to 55 degrees, such as from 40 to 45 degrees, such as about 45 degrees, such as 45 degrees. The intermediate positions refer to any position between the closed position and the open position, and also includes wherein the leading edge 132, 142 of each respective one vane of the plurality of vanes 130, 140, is spaced from the trailing edge 134, 144 of an adjacent one vane of the plurality of vanes 130, 140. In the one representative position (a 60% open position as shown in FIGS. 13B, 14B, 15B), the vane angle (α) is between the vane angle (α) defining the closed position (i.e., 90 degrees) and the vane angle (α) defining the open position. In FIG. 12B, the 60% open position refers to a vane angle (α) that is between 55 and 70 degrees, such as from 60 to 65 degrees, such as about 64 degrees, such as 64 degrees. In these intermediate and open positions position, the leading edge 132 the one vane 130 is also positioned adjacent to the one spacer 400C, while the leading edge 142 of the one vane 140 is also positioned adjacent to the other one of the spacers 400C, but the gap is increasing between the respective leading edges 132 or 142 and the respective spacer 400C as the vanes are moved toward the open position, thereby adjusting the flow of exhaust gas between two scrolls (i.e., between a vane 130, 140 and spacer 400C) through the vane ring 100 during a respective pulse from either the first or second set of cylinders 70, 72 in accordance with the increased size of the gap.

In the one intermediate position and closed position (see FIGS. 13A-B, 14A-B, 15A-B, however, as compared with the embodiment of FIGS. 12A-B, the leading edge 132 of one of said first set of vanes 130 is positioned adjacent to the first one 400A of the plurality of spacers 400 and the leading edge 142 of one of said second set of vanes 140 is positioned adjacent to the second one 400B of the plurality of spacers 400 in one of said one or more intermediate positions, thereby reducing scroll to scroll leakage between the vanes 130, 140 and the respective tongue 61, 63 in the low engine speed conditions associated with the one intermediate position and open position. In the open position (see FIGS. 13C, 14C, 15C), corresponding to higher engine speeds, the leading edge 132 of one of said first set of vanes 130 is spaced from the first one 400A of the plurality of spacers 400 and the leading edge 142 of one of the second set of vanes 140 is spaced from the second one 400B of the plurality of spacers 400, thereby allowing increased scroll leakage between the vanes 130, 140 and the respective tongue 61, 63 for reduced back pressure.

Still further, in each of FIGS. 13-15, the leading edge 132 of one of the first set of vanes 130 is positioned adjacent to the first one 400A of the plurality of spacers 400 and the leading edge 142 of the one of the second set of vanes 140 is positioned adjacent to the second one 400B of the plurality of spacers 400 in each position between the one intermediate position shown in FIGS. 13B, 14B, 15B and the closed position 13A, 14A, 15A.

In the configurations of FIGS. 13-15, assuming generally equal pulses of exhaust gas being produced corresponding to an exhaust stroke of each of the first and second groups of cylinders 70, 72 (i.e., as defined herein, the term "generally equal" refers to an exhaust gas emission from each of the first and second groups of cylinders, with generally equal being defined as having an exhaust gas emission of the first set of cylinders 70 being within thirteen percent of the exhaust gas emission of the second set of cylinders 72 corresponding to each respective exhaust stroke), the first volute flow parameter 55 is different (such as larger or smaller) from the corresponding second volute flow parameter 57 by virtue of e.g. the difference in runner length and turning radius of the first volute 54 compared to the of the second volute 56, even though the critical throat areas are the same. Moreover, the corresponding first vane flow parameter 135 has a value lower than the corresponding second vane flow parameter 145 by virtue of the inclusion of one additional vane 140 in the second arcuate region 115 (i.e., FIG. 12 illustrates a vane ring 100 having six vanes 140 in the second arcuate region 115 and only five vanes 130 in the first arcuate region 105). These statements are true regardless of whether the plurality of vanes 130, 140 are in the closed position as shown in FIGS. 13A, 14A, 15A the open position as shown in FIGS. 13C, 14C, 15C or any one of the intermediate positions, including the one intermediate position as shown in FIGS. 13B, 14B, 15B.

Accordingly, the first total flow parameter 165 is generally equal to the second total flow parameter 175 (i.e., there is generally equal exhaust flow from the first volute 54 through the vane ring 100 to the turbine blades 45 during a pulse of exhaust gas from the first group of cylinders 70 as from the second volute 56 through the vane ring 100 to the turbine blades 45 during a pulse of exhaust gas from the second group of cylinders 72), regardless of whether the plurality of vanes 130, 140 are in the closed position as shown in FIGS. 13A, 14A, 15A, the open position as shown in FIGS. 13C, 14C, 15C, or any one of the intermediate positions, including the one intermediate position as shown in 13B, 14B, 15B. As defined herein, the term "generally equal" refers to a first total flow parameter value that is within twenty, such as within thirteen, such as within seven or five or two, percent of another total flow parameter value, and as defined in a dual volute turbocharger 32 as used herein wherein the values of the total first flow parameter 165 are within ten percent of the total second flow parameter 175, such as within ten percent, such as within seven percent, such as within five percent, such as within two percent. The "generally equal flow rates" of the first and second total flow parameters 165, 175 may also alternatively be referred to herein as "equalized flow" or an equivalent term. While the total flow parameters 165, 175 are generally equal as described above, the first total flow parameter 165 in the embodiment of FIG. 12 is slightly higher (i.e. has a value slightly larger) than the corresponding second total flow parameter 175, but with the allowable deviations of flow values described above (i.e., within twenty, or within thirteen or with seven percent as described above). To achieve the generally equal flow rates or equalized flow, when the first volute flow parameter 55 is different, such as larger, than the second volute flow parameter 57, such as shown in FIG. 2, the second vane flow parameter 175 is different, such as larger, than the first vane flow parameter 165.

However, in the embodiment of FIG. 12A-C, while the equal vane spacing (β) and equal vane angles (a) of the respective vanes 130 and 140, alone or in combination with the equal vane pitch circle radii (ϕ/2), achieves the generally equalized flow as described above, the high degree of periodic cyclic pressure fluctuations that excite the turbine wheel 42 may increase the risk of high cycle fatigue (HCF) even where there is generally equalized flow. Further, while the relative positioning of the spacers 400D in the embodiment of FIG. 12A-C contributes to the generally equalized flow and minimize flow disturbance of exhaust gas flowing from the one or more volutes 54, 56 to the turbine wheel 42, as described above, the lack of a spacer 400 positioned adjacent to the first tongue 61 and to the second tongue 63 allows scroll leakage to between the vanes 130, 140 and the respective first and second tongue 61, 63 that occurs as the vanes 130, 140 are moved.

In still a further embodiment of the present invention (not shown), an entryway system 30 in accordance with the present invention having a plurality of vanes 130, 140 rotatably disposed on the vane ring surface 102 and having a symmetric vane pattern (i.e., with equal vane spacing (β) and equal vane pitch circle radius (ϕ/2)) with unequal tongue clocking angles ((γ) and (γ')) such as shown in the configurations in FIG. 12, in combination with the first one 400A and the second one 400B of the aerodynamic spacers 400 and optionally with one or more additional spacers 400C such as shown in the configurations of FIGS. 13-15, is also contemplated.

Similar to the embodiments of FIGS. 13-15, the plurality of vanes 130, 140 of this further embodiments are moveable between the closed position, the open position, and the one or more intermediate positions between the closed and open position, with the leading edge 132 of one of the first set of vanes 130 positioned adjacent to the first one 400A of the aerodynamic spacer and with the leading edge 142 of one of the second set of vanes 140 positioned adjacent to the second one 400B of the aerodynamic spacers in one of the one or more intermediate positions, the closed position, and in each one intermediate position between the one of the intermediate positions and the closed positions.

In certain embodiments, including those as shown in FIGS. 13-15 and in the additional embodiment having the symmetric vane pattern as described above, the first one 400A and the second one 400B of the aerodynamic spacers 400 may be configured as a circular post similar in size and shape to the additional spacers 400C as illustrated in FIGS. 13-15 and spacers 400D as illustrated in FIG. 12. However, in alternative embodiments, the size and shape of the first one 400A and the second one 400B of the aerodynamic spacers 400 may be altered to provide the entryway system 30 with further desirable flow characteristics as compared with spacers 400C in a circular post configuration. FIGS. 16 and 17 provide two such alternative configurations for the first one aerodynamic spacers 400A, 400B for use in the entryway system 30 of FIGS. 2-6 and FIGS. 13-15. FIGS. 18-20 illustrate various configurations for coupling the first one 400A and the second one 400B of the aerodynamic spacers 400 of FIG. 16 or 17 to a respective annular disk 101 that prevent rotation of prevent rotation of said first and second one of said spacers about an axis extending normal to the vane ring surface 102 (or normal to the inner vane ring surface 102A).

Referring first to FIGS. 16 and 17, each of the aerodynamic spacers 400A, 400B includes a body portion 450 that includes an arced inner surface 452 and an opposing outer surface 454. The opposing outer surface 454 is preferably arced as well in a manner that corresponds the arcing of the outer circumferential ring 106 of the annular disk 101. The arced length of the outer surface 454 is preferably sized to correspond the arced terminal end length of a respective one of the tongues 61, 63.

In addition, each of the aerodynamic spacers 400A, 400B also includes a pair of projections 456, 470 and 458 extend from opposing upper and lower sides of the body portion 450, with each of the projections 456, 470 and 458 configured to be coupled within a corresponding opening in a respective annular disk 101 in a manner that prevent rotation of said first and second one 400A, 400B of said spacers about an axis extending normal to the vane ring surface 102. In FIG. 16, the first projection 456 is tubular in shape, and thus has a circular cross-section, while the first projection 470 is non-circular, such as in a "double d" shape in cross-section as illustrated.

Still further, each of the aerodynamic spacers 400A, 400B includes a pair of non-circular slots 460, 462 extending between and open through the opposing upper and lower sides of the body portion 450. The first non-circular slot 460 is positioned between the pair of projections 456, 470, and 458 and the arced inner surface 452, while the second non-circular slot 462 is positioned between the pair of projections 456, 470 and 458 and the opposing outer surface 454.

As shown in FIGS. 18-20, the aerodynamic spacers 400A, 400B of FIGS. 17 and 18 can be coupled to the annular disk 101, or to the pair of spaced apart annular disks 101A, 101n, in alternative ways.

Referring first to FIG. 18, the aerodynamic spacers 400A, 400B of FIG. 17 may be coupled to the annular disk 101 or disks 101A, 101B as follows. First, the first projection 470 is inserted within a non-circular opening 480 contained within one of the annular disks 101 (here shown as annular disk 101A). The non-circular opening 480 extends within the inner vane ring surface 102A and is sized and shaped to correspond to the first projection 470 (i.e., it may have the same "double d" type opening). Owing to the non-circular first projection 170 and corresponding non-circular opening 480, the aerodynamic spacers 400A, 400B cannot rotate about an axis that extends normal to the vane ring surface 102. When inserted, the outer surface 454 is aligned with the outer circumferential ring 106 of the annular disk 101, while the arced inner surface 452 extends circumferentially inward.

Referring next to FIG. 19, the aerodynamic spacers 400A, 400B of FIG. 16 may be coupled to the annular disk 101 or disks 101A, 101B as follows. First, the first projection 456 is inserted within a circular opening 482 contained within one of the annular disks 101 (here shown as annular disk 101A), with annular disk 101 having an interior surface defining the circular opening 482. The circular opening 482 extends within the inner vane ring surface 102A and is sized and shaped to correspond to the first projection 456 (i.e., it may have the same or slightly larger cross-sectional diameter). Next, a pin 502 is inserted through, and preferably slip-fit or press-fit to, one of the non-circular slots 460, 462 (here shown as within non-circular slot 460) and within a pin opening 484 contained within one of the annular disks 101 (here shown as annular disk 101A) which is spaced from the circular opening 480, with the annular disk 101 having the interior surface also defining the pin opening 484. The pin 502, in certain embodiments, is fixedly coupled within the interior of the pin opening 484 such as through welding or riveting. The introduction of the pin 502 prevents the aerodynamic spacers 400A, 400B from rotating about an axis that extends normal to the vane ring surface 102. When inserted, the outer surface 454 is aligned with the outer circumferential ring 106 of the annular disk 101, while the arced inner surface 452 extends circumferentially inward.

Referring next to FIG. 20, the aerodynamic spacers 400A, 400B of FIG. 16 may be coupled to the annular disk 101, and preferably to the annular disk 101A 101B as follows. First, the first projection 456 is inserted within a circular opening 486 contained within one of the annular disks 101 (here shown as annular disk 101B), with annular disk 101 having an interior surface defining the circular opening 486. The circular opening 486 extends within the inner vane ring surface 102A and is sized and shaped to correspond to the first projection 456 (i.e., it may have the same or slightly larger cross-sectional diameter). Next, a headed pin 504 is inserted through, and preferably slip-fit or press-fit to, one of the non-circular slots 460, 462 (here shown as within non-circular slot 460) and within a headed pin opening 488 contained within one of the annular disks 101 (here shown as annular disk 101B) which is spaced from the circular opening 486, with the interior surface of the annular disk 101 also defining the headed pin opening 488. The headed pin 504, in certain embodiments, is press fit within the interior of the pin opening 484. Alternatively, the headed pin 504 may be fixedly coupled within the interior of the pin opening 484 such as through welding or riveting. The introduction of the headed pin 504 prevents the aerodynamic spacers 400A, 400B from rotating about an axis that extends normal to the vane ring surface 102. When inserted, the outer surface 454 is aligned with the outer circumferential ring 106 of the annular disk 101, while the arced inner surface 452 extends circumferentially inward towards the inner circumferential ring 104 relative to the outer surface 454.

In each of the embodiments of FIGS. 18 to 20, as noted above, the aerodynamic spacers 400A, 400B are coupled to the annular disk 101 in a manner that prevents rotation about an axis extending normal to the vane ring surface 102.

Further, after completion of the assembly for forming the entryway system 30, and as best shown in FIGS. 13-15, the outer surface 454 of the first one 400A of the aerodynamic spacer is aligned with and adjacent to the corresponding terminal end surface of the first tongue 61 of the wall 60, while the outer surface 454 of the second one 400B of the aerodynamic spacer is aligned with and adjacent to the corresponding terminal end surface of the second tongue 63 of the wall 60. In addition, the arced inner surface 452 of the first one 400A and of the aerodynamic spacers is positioned circumferentially outward of each of the plurality of vanes 130, 140 and is generally aligned a corresponding one vane of the plurality of the first vanes 130, while the second one 400B of the aerodynamic spacer is of the aerodynamic spacers is positioned circumferentially outward of each of the plurality of vanes 130, 140 and is generally aligned a corresponding one vane of the plurality of the second vanes 140.

Accordingly, when the plurality of vanes 130, 140 are moved between and including the one intermediate position (see FIGS. 13B, 14B, 15B) and the closed position (FIGS. 13A, 14A, 15A), the leading edge 132 of one of the first set of vanes 130 is positioned adjacent to the arced inner surface 452 of the first one spacer 400A, while the leading edge 142 of one of the second set of vanes 140 is positioned adjacent to the arced inner surface 452 of the second one spacer 400B to minimize scroll leakage as desired at lower engine speeds. Still further, the arced movement of the respective vane 130, 140 between these positions preferably corresponds to the arc along the arced inner surface 452 so that the same generally small gap between leading edge 132, 142 and the arced inner surface 452 is maintained at each of the closed positions through the one intermediate position (such as in FIGS. 13B, 14B, 15B) to maintain a generally constant and minimal scroll leakage. In positions between the one intermediate position (see FIGS. 13B, 14B, 15B) and the open position (FIGS. 13C, 14C, 15C), the leading edge 132 of one of the first set of vanes 130 spaced from the arced inner surface 452 of the first one spacer 400A, while leading edge 142 of one of the second set of vanes 140 is spaced from the arced inner surface 452 of the second one spacer 400B, thereby allowing increased scroll to scroll leakage as desired at high engine speeds.

Referring back to FIG. 1, in certain embodiments, the system 30 also includes a controller 146 that is coupled to turbocharger 32 and/or to the internal combustion engine 34 that controls the various other components of the turbocharger 32 and/or internal combustion engine 34. The controller 146 may include one or more processors, or microprocessors, for processing instructions stored in memory 150 to control various functions on the turbocharger 32 related to the introduction of the exhaust gas within the turbine housing interior 40 through the first and second volutes 54, 56. Such instructions may be any of the functions, algorithms or techniques described herein performed by the controller 146. Additionally, or alternatively, the controller 146 may include one or more microcontrollers, field programmable gate arrays, systems on a chip, discrete circuitry, and/or other suitable hardware, software, or firmware that is capable of carrying out the functions described herein. In some embodiments, the controller 146 is an engine control unit (ECU) that controls the various other components of the turbocharger 32 and/or internal combustion engine 34. In embodiments where the controller 146 is the engine control unit, the controller 146 is separate from the turbocharger 32. In other words, the controller 146 is a separate component that is not included on or in the turbocharger 32. In other embodiments, the controller 146 is discrete from the ECU. For example, the controller 146 may be included on or in the turbocharger 32. In other words, the controller 146 is a component included on or in the turbocharger 32. With reference to FIG. 1, the system 30 may include the turbocharger 32, the internal combustion engine 34, and the controller 146. Typically, the system 30 also includes at least one sensor 148.

While the embodiments illustrated include the use of the vane ring 100 having an asymmetric vane pattern in accordance with the present invention in the turbocharger 32 having a dual volute turbine housing 36, the present invention is not limited to the arrangement provided. For example, the vane ring 100 may be included in a single volute turbine housing, or in a divided volute housing having more than two volutes, and still provide the benefit of generally equal flow symmetry and reduced HCF in the same manner as with a dual volute turbine housing 32. Still further, while the vane ring 100 as illustrated includes eleven total vanes, the total number of vanes may be varied from eleven to any other total odd number of vanes to maintain the asymmetry of the vane pattern and may include a varying number of tongues 61, 63 than the two provided.

Even further, other asymmetric vane patterns capable of achieving the benefit of generally equal flow symmetry and reduced HCF in the entryway system 30 are also contemplated. For example, one or both of the respective first and/or the second set of vanes 130, 140 may include at least three vanes, such as four or more vanes, and wherein the circumferential distance between any two adjacent of such vanes 130, 140 of the respective first or second set of vanes 130, 140 may be different or the same. In an embodiment wherein the first set of vanes 130 includes at least three vanes, a first circumferential distance between a first one of the first set of vanes 130 and a second one of the first set of vanes 130 is different than a second circumferential distance between the second one of the first set of vanes 130 and a third one of the first set of vanes 130. In a further embodiment wherein the first set of vanes 130 includes a fourth vane, a third circumferential distance between the fourth one of the first set of vanes 130 and the third one of the first set of vanes 130 is equal to the first circumferential distance or the second circumferential distance.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An entryway system comprising:
a divided volute turbocharger for receiving exhaust gas from an internal combustion engine and for delivering compressed air to the internal combustion engine, the internal combustion engine including a first set of cylinders and a second set of cylinders, with a relative pulse of the exhaust gas delivered from the first and second set of cylinders being generally equal for each exhaust stroke, said divided volute turbocharger comprising:
a turbine housing comprising a turbine housing interior adapted to receive a turbine wheel having a plurality of equally spaced turbine blades,
a first volute adapted for fluid communication with the internal combustion engine and said turbine housing interior for delivering exhaust gas from the first set of cylinders to said turbine housing interior,
a second volute adapted for fluid communication with the internal combustion engine and said turbine housing interior for delivering exhaust gas from the second set of cylinders to said turbine housing interior independently of said first volute,
a turbine housing outlet in fluid communication with said turbine housing interior, and
a wall separating said first volute from said second volute and including a first tongue and a second tongue spaced from said first tongue;
a vane ring disposed in said turbine housing interior between said first and second volutes and around said turbine wheel, said vane ring comprising an annular disk including a vane ring surface disposed between an inner circumferential ring and an outer circumferential ring with said inner circumferential ring defining an orifice for receiving said turbine wheel, with first and second tongue each separately terminating at a position adjacent to said outer circumferential ring, and with said vane ring surface including a plurality of vanes having an asymmetric vane pattern and comprising:
a first set of vanes comprising a plurality of vanes rotatably disposed in a spaced apart manner along a first arcuate region of said vane ring surface, and a second set of vanes comprising a plurality of vanes disposed in a spaced apart manner along a second arcuate region of said vane ring surface, with said second set of vanes and said first set of vanes rotatably disposed on said vane ring surface and wherein said second set of vanes are disposed differently than said first set of vanes to define the asymmetric vane pattern; and
a plurality of spacers disposed in a spaced apart manner on said vane ring surface and positioned circumferentially outward from each vane of said first and second set of vanes, with a first one of said plurality of spacers positioned adjacent to said first tongue and with a second one of said plurality of spacers positioned adjacent to said second tongue, with said first one and said second one of said plurality of spacers defining said first arcuate region and said second arcuate region along said vane ring surface.

2. The entryway system of claim 1, wherein said first set of vanes defines a first vane flow parameter in an area located between said first arcuate region and an interior surface of said turbine housing downstream of said first volute for receiving the relative pulse of exhaust gas from said first volute corresponding to an exhaust stroke of the first group of cylinders, and
wherein said second set of vanes defines a second vane flow parameter in an area located between said second arcuate region and said interior surface of said turbine housing downstream of said second volute for receiving the relative pulse of exhaust gas from said second volute corresponding to an exhaust stroke of the second group of cylinders.

3. The entryway system of claim 2, wherein said first volute defines a first volute flow parameter for the relative pulse of exhaust gas received from the first group of cylinders;
wherein said second volute defines a second volute flow parameter for the relative pulse of exhaust gas received from the second group of cylinders;
wherein said first volute flow parameter in series combination with said first vane flow parameter defines a first total flow parameter, and wherein said second volute flow parameter in series combination with said second vane flow parameter defines a second total flow parameter; and
wherein the value of said first total flow parameter is within twenty percent of the value of said second total flow parameter.

4. The entryway system of claim 2, wherein the value of said first and second volute flow parameter are each individually determined according to the equation:

$$\delta = (m\sqrt{T})/P,$$

wherein δ is the first or second volute flow parameter, m is a mass flow of the exhaust gas through a respective one of said first and second volute, T is an exhaust gas temperature at an inlet of said respective one of said first and second volute, and P is an exhaust gas pressure at said inlet of said respective one of said first and second volute.

5. The entryway system of claim 4, wherein each of said first one and said second one of said spacers has an arced inner surface,
- wherein said leading edge of one of said first set of vanes is positioned adjacent to said arced inner surface of said first one of said plurality of spacers and said leading edge of one of said second set of vanes is positioned adjacent to said arced inner surface of said second one of said plurality of spacers in one of said one or more intermediate positions,
- wherein said leading edge of said one of said first set of vanes is positioned adjacent to said arced inner surface of said first one of said plurality of spacers in each position between said one intermediate position and said closed position, and
- wherein said leading edge of said one of said second set of vanes is positioned adjacent to said arced inner surface of said second one of said plurality of spacers in each position between said one intermediate position and said open position.

6. The entryway system of claim 5, wherein each of said first one and said second one of said spacers extends to said outer circumferential ring of said annular disk with said first one of said spacers aligned with said first tongue of said wall and with said second one of said spacers aligned with said second tongue of said wall.

7. The entryway system of claim 5, wherein each of said first one and said second one of said spacers are coupled to said annular disk to prevent rotation of said first and second one of said spacers about an axis extending normal to said vane ring surface.

8. The entryway system of claim 7, wherein each of said first and second one of said spacers includes a non-circular slot; and
- wherein said annular disk includes a first non-circular projection received within said non-circular slot of said first spacer and a second non-circular projection received within said non-circular slot of said second spacer.

9. The entryway system of claim 7, wherein said annular disk includes an interior surface defining a pair of spaced apart openings, and wherein each of said first and second one of said spacers includes a pin retained within a corresponding one of said pair of spaced apart openings.

10. The entryway system of claim 9, wherein said pin is fixedly coupled to said interior surface.

11. The entryway system of claim 5, wherein each of said first and second one of said spacers includes a non-circular projection received within a corresponding non-circular opening of said annular disk.

12. The entryway system of claim 1, wherein each vane of said first set of vanes and said second set of vanes extends in length from a leading edge to a trailing edge and are rotatable along said vane ring surface about a vane pivot axis between a closed position and an open position and through one or more intermediate positions between said closed and open position, said vane pivot axis extending in a direction normal to a plane defining said vane ring surface of said annular disk,
- wherein said leading edge of each respective one vane of said plurality of vanes is positioned adjacent to said trailing edge of an adjacent one vane of said plurality of vanes in said closed position,
- wherein said leading edge of said each respective one vane of said plurality of vanes is spaced from said trailing edge of said adjacent one vane of said plurality of vanes in said open position and in each one of said one or more intermediate positions, and
- wherein said leading edge of one of said first set of vanes is positioned adjacent to said first one of said plurality of spacers and said leading edge of one of said second set of vanes is positioned adjacent to said second one of said plurality of spacers in one of said one or more intermediate positions.

13. The entryway system of claim 12, wherein said leading edge of said one of said first set of vanes is positioned adjacent to said first one of said plurality of spacers and said leading edge of said one of said second set of vanes is positioned adjacent to said second one of said plurality of spacers in said closed position.

14. The entryway system of claim 13, wherein said leading edge of said one of said first set of vanes is positioned adjacent to said first one of said plurality of spacers and said leading edge of said one of said second set of vanes is positioned adjacent to said second one of said plurality of spacers in each position including and between said one of said one or more intermediate positions and said closed position.

15. The entryway system of claim 12, wherein a relative positioning of each of said first and second set of vanes, respectively, defines a vane pivot point (VPP) and a vane pitch circle radius ($\phi/2$),
- wherein said vane pivot point (VPP) is defined as a point located at a distance between said leading edge and said trailing edge along a length of the mean chord line ML of a respective one vane of said first and second set of vanes,
- wherein said vane pitch circle radius ($\phi/2$) is defined as the length of the radial line RL extending from the axis of rotation of said turbine wheel to said vane pivot point (VPP) of said respective one vane of said first and second set of vanes, and
- wherein said vane pitch circle radius ($\phi/2$) of said first set of vanes differs from said vane pitch circle radius ($\phi/2$) of said second set of vanes.

16. The entryway system of claim 15, wherein said vane pitch circle radius ($\phi/2$) of said second set of vanes is between one and two times greater than said vane pitch circle radius ($\phi/2$) of said first set of vanes.

17. The entryway system of claim 15, wherein a relationship between said first and second tongues defines a first tongue clocking angle ($\gamma$) and a second tongue clocking angle ($\gamma'$), with the sum of the first and second tongue clocking angle (($\gamma$)+($\gamma'$)) totaling 360 degrees; and
- wherein each of said first and second clocking angles are respectively defined as an angle between two respective radial lines extending from an axis of rotation of said vane pivot point (VPP) between said first and second tongues, and
- wherein said first tongue clocking angle corresponds to said first arcuate region and measures less than or equal to 180 degrees and wherein said second tongue clocking angle corresponds to said second arcuate region and measures greater than or equal to 180 degrees.

18. The entryway system of claim 12, wherein a relationship between a successive pair of vanes of said plurality of vanes defines a vane spacing ($\beta$), and wherein at least one respective pair of vanes of said plurality of vanes has a different vane spacing ($\beta$) than another respective pair of vanes of said plurality of vanes.

19. The entryway system of claim 18, wherein a relationship between said first and second tongues defines a first tongue clocking angle ($\gamma$) and a second tongue clocking angle (γ'), with the sum of the first and second tongue clocking angle ((γ)+(γ')) totaling 360 degrees; and wherein each of said first and second clocking angles are respectively defined as an angle between two respective radial lines extending from an axis of rotation to a respective one of said first and second tongues, and wherein said first tongue clocking angle corresponds to said first arcuate region and measures less than or equal to 180 degrees and wherein said second tongue clocking angle corresponds to said second arcuate region and measures greater than or equal to 180 degrees.

20. The entryway system of claim 18, wherein a total number of adjacent pairs of said plurality of vanes having a vane spacing (β) greater than a mean average vane spacing is no more than one-half a total number of adjacent pairs of said plurality of vanes having a vane spacing (β) less than said mean average vane spacing, and wherein a standard deviation of said vane spacings from said mean average vane spacing is in a range of 0.1 to 6.

* * * * *